United States Patent [19]
Sato

[11] Patent Number: 5,671,056
[45] Date of Patent: Sep. 23, 1997

[54] THREE-DIMENSIONAL FORM MEASURING APPARATUS AND METHOD

[75] Inventor: Tsuyoshi Sato, Tokyo, Japan

[73] Assignee: Technology Research Association of Medical & Welfare Apparatus, Tokyo, Japan

[21] Appl. No.: 647,147

[22] Filed: May 9, 1996

[30] Foreign Application Priority Data

| May 11, 1995 | [JP] | Japan | 137344 |
|---|---|---|---|
| Jun. 2, 1995 | [JP] | Japan | 159828 |
| Jun. 2, 1995 | [JP] | Japan | 159829 |
| Jun. 2, 1995 | [JP] | Japan | 159830 |

[51] Int. Cl.$^6$ .................................................. G01B 11/24
[52] U.S. Cl. ......................................... 356/376; 356/394
[58] Field of Search ................................. 356/376, 372, 356/373, 375, 394; 250/559.21, 559.22, 559.24; 433/29, 24; 4/44, 68

[56] References Cited

U.S. PATENT DOCUMENTS

| 4,111,557 | 9/1978 | Rottenkolber et al. | 356/394 |
|---|---|---|---|
| 5,129,010 | 7/1992 | Higuchi et al. | 356/376 |
| 5,280,542 | 1/1994 | Ozeki et al. | 356/375 |
| 5,369,490 | 11/1994 | Kawai et al. | 356/376 |
| 5,548,405 | 8/1996 | Motosugi | 356/376 |

*Primary Examiner*—Hoa Q. Pham
*Attorney, Agent, or Firm*—Foley & Lardner

[57] ABSTRACT

A three-dimensional form measuring apparatus of the present invention comprises (i) an optical distance measuring equipment for irradiating an object to be measured with slit-like irradiation light and for receiving, on a two-dimensional light receiving sensor, reflected light from the object; (ii) a position setting mechanism for setting a relative positional relationship between the optical distance measuring equipment and the object; (iii) a signal selecting section which detects whether or not the width and maximum luminance of an optical image reflected by the object are within a predetermined range and thereby selects, as an output signal for preparing data, an output signal of the two-dimensional light receiving sensor concerning the relative positional relationship between the optical distance measuring equipment and the object set by the position setting mechanism; and (iv) a form data preparing section which prepares a three-dimensional form data of the object based on the output signal of the two-dimensional light receiving sensor selected by the signal selecting section. Accordingly, errors in measurement caused by the inclination of the measuring surface are reduced, whereby the three-dimensional form of the object can be stably measured with a high accuracy.

24 Claims, 12 Drawing Sheets

THREE-DIMENSIONAL FORM MEASURING APPARATUS AND METHOD

BACKGROUND OF THE INVENTION

1. Field of the Invention

This invention relates to a three-dimensional form measuring apparatus and method in which an optical distance measuring equipment utilizing slit-like irradiation light, such as a laser displacement gauge, is used to measure the three-dimensional form of an object to be measured.

2. Related Background Art

In recent years, not only the conventional combinations of one-dimensional measurement types such as height measurement and length measurement but also three-dimensional objects with free curved surfaces have been subjected to three-dimensional form measurement. Studies concerning the form measurement of these three-dimensional objects have been in progress as well. As a method for measuring such a three-dimensional object, in addition to the conventional contact type measuring method in which measurement is effected while a contact type probe is in contact with an object to be measured, there is a non-contact type measuring method using an optical distance measuring equipment such as laser displacement gauge which has recently developed to a remarkable degree.

According to the non-contact type measuring method, since it is not necessary for a probe to come into contact with the object to be measured, soft materials such as rubber can be measured with a high accuracy. Also, as compared with the contact type measuring method, the non-contact type measuring method is advantageous in that the time required for measurement can be shortened. However, even the non-contact type measuring method using an optical distance measuring equipment such as laser displacement gauge has not yet been capable of accurately measuring the whole peripheral area of an object having an arbitrary free curved surface.

It is due to the fact that the gradient of a normal of a point positioned on an object to be measured, namely, that of a point to be measured, is unknowable. Accordingly, in the measurement performed with irradiation of light such as laser, due to the inclination of the surface on which the point to be measured is positioned, accuracy in the measurement largely depends on the angle of the irradiation light with respect to the object to be measured and the angle of reflected light from the object to be measured. Therefore, the measurement may become impossible when these angles become greater than predetermined values.

Here, in the case of three-dimensional form measurement based on projection of light, for example, slit-like irradiation light is projected onto a measuring surface in the object to be measured. The light reflected therefrom is received by a light receiving section such as CCD, whereby a reflected light image of the irradiation light is detected. Then, from the center position of the reflected light image, three-dimensional coordinates are calculated. Of course, objects placed outside of the area within which the irradiation light is reachable cannot be measured.

SUMMARY OF THE INVENTION

An object of the present invention is to provide a three-dimensional form measuring apparatus and method in which errors in measurement due to the inclination of the measuring surface in the object to be measured are reduced, whereby the three-dimensional form of the object to be measured can be measured stably with a high accuracy.

A further object of the present invention is to provide a three-dimensional form measuring apparatus and method in which the lowering of accuracy in measurement due to distortion in the measurement optical system is suppressed, whereby the three-dimensional form of the object to be measured can be measured stably with a high accuracy.

In order to attain the above-mentioned objects, the three-dimensional form measuring apparatus in accordance with the present invention comprises (i) an optical distance measuring equipment including an irradiating section for irradiating an object to be measured with slit-like irradiation light and a light receiving section which has a two-dimensional sensor composed of a plurality of light receiving devices arranged two-dimensionally and receives, on the two-dimensional light receiving sensor, incident reflected light from the object irradiated with the irradiation light; (ii) a position setting mechanism for setting a relative positional relationship between the optical distance measuring equipment and the object; (iii) a signal selecting section which detects whether or not the width and maximum luminance of an optical image reflected by the object are within a predetermined range and thereby selects, as an output signal for preparing data, an output signal of the two-dimensional light receiving sensor concerning the relative positional relationship between the optical distance measuring equipment and the object set by the position setting mechanism; and (iv) a form data preparing section which prepares a three-dimensional form data based on the output signal of the two-dimensional light receiving sensor selected by the signal selecting section.

Preferably, the three-dimensional form measuring apparatus of the present invention further comprises a control section for controlling each operation of the position setting mechanism and irradiating section, and a position detecting mechanism for detecting the position or moving amount of the position setting mechanism.

Also, preferably, in the three-dimensional form measuring apparatus of the present invention, in order to select the output signal for preparing data from output signals of the two-dimensional light receiving sensor, the signal selecting section detects whether or not the position, width, and maximum luminance of the optical image reflected by the object are within a predetermined range.

Further, in the three-dimensional form measuring apparatus of the present invention, the irradiating section preferably includes a semiconductor laser for generating the irradiation light and a cylindrical lens for shaping the irradiation light emitted from the semiconductor laser into a slit-like form.

Also, preferably, the three-dimensional form measuring apparatus of the present invention further comprises an arithmetic processing section which computes a correction equation for correcting the distortion caused by the optical system of the optical distance measuring equipment, while the form data preparing section prepares the three-dimensional form data of the object based on the output signal of the two-dimensional light receiving sensor selected by the signal selecting section and the correction equation computed by the arithmetic processing section.

Further, preferably, in the three-dimensional form measuring apparatus of the present invention, the position setting mechanism is configured as a position setting and changing mechanism which sets or changes the relative positional relationship between the optical distance measuring equipment and the object, while the signal selecting section detects whether or not the width and maximum luminance of the optical image reflected by the object are within the predetermined range and thereby selects, as the output signal for preparing data, the output signal of the two-dimensional light receiving sensor in the relative positional relationship between the optical distance measuring equipment and the object changed by the position setting and changing mechanism.

In this case, desirably, the three-dimensional form measuring apparatus of the present invention further comprises a control section for controlling each operation of the position setting and changing mechanism and irradiating section, and a position detecting mechanism for detecting the position or moving amount of the position setting and changing mechanism.

Also, in the three-dimensional form measuring apparatus of the present invention, based on the output signal of the two-dimensional light receiving sensor, the signal selecting section desirably outputs an error signal, which indicates that measurement is impossible, when the width and maximum luminance of the optical image reflected by the object are outside of the predetermined range.

Further, in the three-dimensional form measuring apparatus of the present invention, based on the output signal of the two-dimensional light receiving sensor, the signal selecting section desirably outputs an error signal, which indicates that measurement is impossible, and/or outputs a control signal for instructing the position setting and changing mechanism to change the relative positional relationship between the optical distance measuring equipment and the object, when the width and maximum luminance of the optical image reflected by the object are outside of the predetermined range.

In this case, more desirably, in the three-dimensional form measuring apparatus of the present invention, in order to select the output signal for preparing data from output signals of the two-dimensional light receiving sensor, the signal selecting section detects whether or not the position, width, and maximum luminance of the optical image reflected by the object are within a predetermined range.

Also, more desirably, the three-dimensional form measuring apparatus of the present invention further comprises a first control section which controls the position setting and changing mechanism so as to set or change the relative positional relationship between the optical distance measuring equipment and the object to a predetermined relationship and a second control section which computes a correction amount for the relative positional relationship between the optical distance measuring equipment and the object concerning the measuring point of the object at which the signal selecting section has generated the error signal and, in response to this correction amount, controls the position setting and changing mechanism.

More desirably, the three-dimensional form measuring apparatus of the present invention further comprises a third control section which, in response to the position and moving amount of the position setting and changing mechanism, controls the operation of the irradiating section and a position detecting mechanism which detects the position or driving amount of the position setting and changing mechanism.

Next, in order to attain the above-mentioned objects, the three-dimensional form measuring method of the present invention comprises (i) a first step of setting, by means of a position setting mechanism, a relative positional relationship between an optical distance measuring equipment and an object to be measured; (ii) a second step of irradiating, by means of an irradiating section of the optical distance measuring equipment, the object with slit-like irradiation light and receiving, on a two-dimensional light receiving sensor composed of a plurality of light receiving devices arranged two-dimensionally at a light receiving section of the optical distance measuring equipment, incident reflected light from the object; (iii) a third step of selecting as an output signal for preparing data, by means of a signal selecting section, an output signal of the two-dimensional light receiving sensor concerning the relative positional relationship between the optical distance measuring equipment and the object set by the position setting mechanism, based on detection of whether or not the width and maximum luminance of an optical image reflected by the object are within a predetermined range; and (iv) a fourth step of preparing, by means of a form data preparing section, a three-dimensional form data of the object based on the output signal of the two-dimensional light receiving sensor selected by the signal selecting section.

Preferably, in the three-dimensional form measuring method of the present invention, in the first step, the operation of the position setting mechanism is controlled by a control section while the position or moving amount of the position setting mechanism is detected by a position detecting mechanism and, in the second step, the operation of the irradiating section is controlled by the control section.

Also, preferably, in the three-dimensional form measuring method of the present invention, in the third step, in order to select the output signal for preparing data from output signals of the two-dimensional light receiving sensor by the signal selecting section, whether or not the position, width, and maximum luminance of the optical image reflected by the object are within a predetermined range is detected by the signal selecting section.

Further, preferably, in the three-dimensional form measuring method of the present invention, in the second step, the irradiation light is generated by a semiconductor laser of the irradiating section and the irradiation light emitted from the semiconductor laser is shaped into a slit-like form by a cylindrical lens of the irradiating section.

Also, in the three-dimensional form measuring method of the present invention, in the fourth step, a correction equation for correcting the distortion caused by the optical system of the optical distance measuring equipment is computed by an arithmetic processing section and then, based on the output signal of the two-dimensional light receiving sensor selected by the signal selecting section and the correction equation computed by the arithmetic processing section, the three-dimensional form data of the object is prepared by the form data preparing section.

Preferably, the three-dimensional form measuring method of the present invention further comprises a fifth step of executing the second and third steps again between the third and fourth steps after the relative positional relationship between the optical distance measuring equipment and the object is set or changed by a position setting and changing mechanism, until the measurement through the whole area of the object is completed.

In this case, desirably, in the three-dimensional form measuring method of the present invention, the operation of the position setting and changing mechanism is controlled by a control section while the position or moving amount of the position setting mechanism is detected by a position detecting mechanism in the first and fifth steps, and the operation of the irradiating section is controlled by the control section in the second step.

Also, desirably, in the three-dimensional form measuring method of the present invention, in the third step, based on the output signal of the two-dimensional light receiving sensor, the signal selecting section outputs an error signal, which indicates that measurement is impossible, when the width and maximum luminance of the optical image reflected by the object are outside of the predetermined range.

Further, desirably, in the three-dimensional form measuring method of the present invention, in the third step, based on the output signal of the two-dimensional light receiving sensor, the signal selecting section outputs an error signal, which indicates that measurement is impossible, and/or outputs a control signal for instructing the position setting and changing mechanism to change the relative positional relationship between the optical distance measuring equipment and the object, when the width and maximum luminance of the optical image reflected by the object are outside of the predetermined range.

In this case, more desirably, in the three-dimensional form measuring method of the present invention, in the third step, in order to select the output signal for preparing data from output signals of the two-dimensional light receiving sensor by the signal selecting section, whether or not the position, width, and maximum luminance of the optical image reflected by the object are within a predetermined range is detected by the signal selecting section.

Also, more desirably, the three-dimensional form measuring method of the present invention further comprises a sixth step of executing the second and third steps again between the fifth and fourth steps after the relative positional relationship between the optical distance measuring equipment and the object concerning the measuring point of the object at which the signal selecting section has generated the error signal is corrected by the position setting and changing mechanism, until there exists no measuring point at which the signal selecting section has generated the error signal; wherein, in the fifth step, the position setting and changing mechanism is controlled by a first control section so as to set or change the relative positional relationship between the optical distance measuring equipment and the object; and wherein, in the sixth step, a correction amount for the relative positional relationship between the optical distance measuring equipment and the object is computed by a second control section and, in response to this correction amount, the position setting and changing mechanism is controlled.

Further, more desirably, in the three-dimensional form measuring method of the present invention, the operation of the position setting and changing mechanism is controlled by a third control section in the first step, the operation of the irradiating section is controlled by the third control section in the second step, and the position or moving amount of the position setting and changing mechanism is detected by a position detecting mechanism in the first, fifth, and sixth steps.

In such a three-dimensional form measuring apparatus and method of the present invention, a condition under which the width and maximum luminance of the reflected light image from the object to be measured or the position, width, and maximum luminance thereof exist within a predetermined range is detected so as to select the output signal for preparing data. Then, based on the optimal output signal of the two-dimensional light receiving sensor satisfying this condition, the three-dimensional form data of the object is prepared.

Accordingly, since errors in measurement due to the inclination of the measuring surface in the object are reduced and thereby correct form measurement data can be obtained as position data and distance data for each measuring point on the object, the three-dimensional form of the object can be stably measured with a high accuracy.

Here, when the output signal for preparing data cannot be selected, there are a case where a mechanism for outputting an error signal, which indicates that the measurement is impossible, is further provided; a case where a mechanism for outputting a control signal for instructing the position setting and changing mechanism to change the relative positional relationship between the optical distance measuring equipment and the object is further provided; and a case where both of these mechanisms are provided.

In these cases, no erroneous form measurement data is prepared, while measuring points which have to be measured again can be found. Alternatively, the output signal for preparing data can be obtained when the measurement is conducted again with respect to the measuring points which have to be measured again, while the relative positional relationship between the optical distance measuring equipment and the object is changed. Thus, more accurate form measurement data can be obtained.

Also, in the case where a coordinate correcting processing for correcting the distortion due to the optical system of the optical distance measuring equipment is performed, the lowering of accuracy in measurement caused by the distortion in the measurement optical system is suppressed and thereby the three-dimensional form of the object can be stably measured with a higher accuracy.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Figure 1:
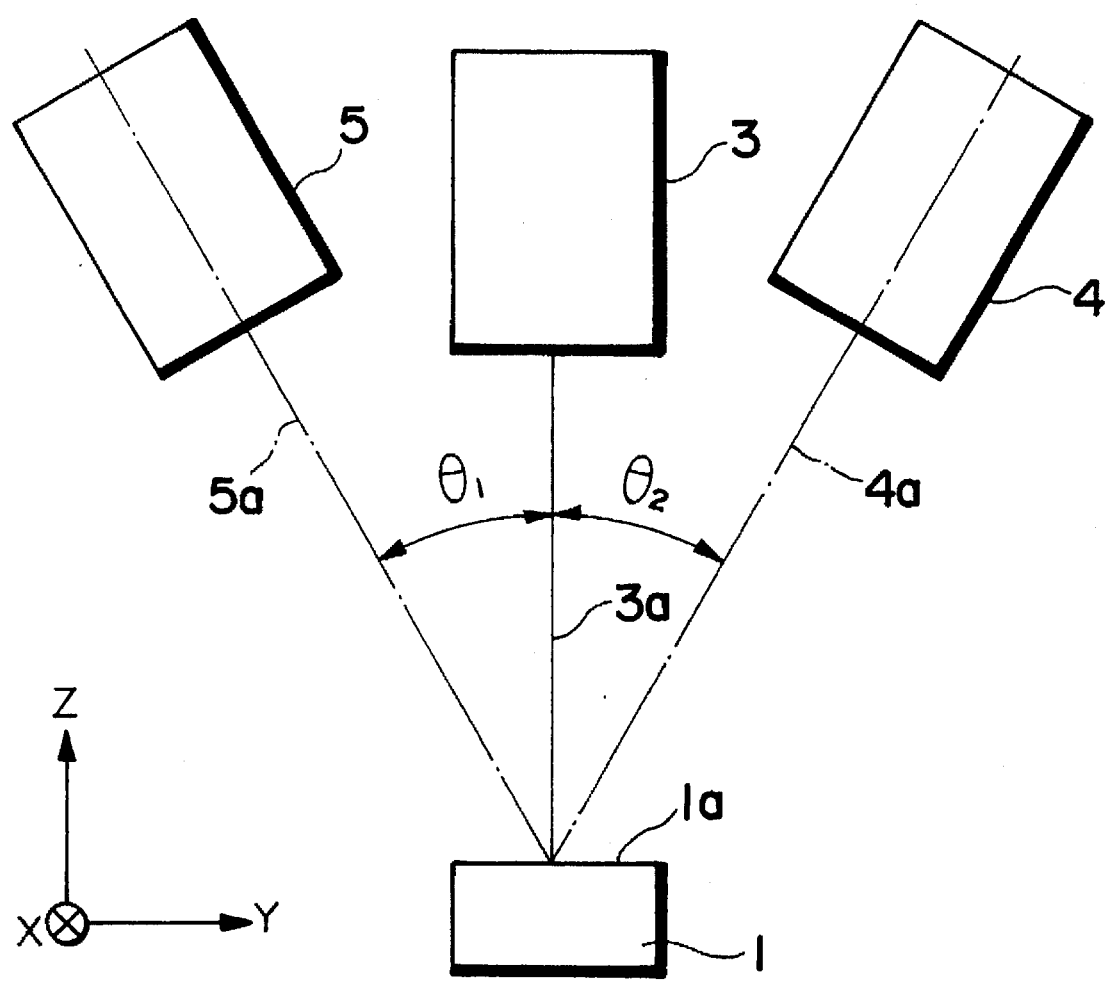
FIG. 1 is a side view schematically showing a configuration of an apparatus for explaining the principle of measuring a three-dimensional form in accordance with the present invention.

In the following, the principle of the three-dimensional form measurement in accordance with the present invention and the configurations and operations of various embodiments concerning the apparatus and method therefor will be explained in detail with reference to FIGS. 1 to 14. The principle of measurement, embodiments, and the like of the present invention, however, should not be restricted to the examples explained hereinafter. Here, in the explanation of the drawings, elements identical to each other will be referred to with marks identical to each other without repeating their overlapping explanations. Also, the ratios of sizes in the drawings do not always correspond to those in the explanation.

Principle of Measurement

The principle of measuring a three-dimensional form in accordance with the present invention is based on so-called optical cutting method. The three-dimensional form measuring method related to such an optical cutting method is described in detail, for example, in U.S. Pat. No. 5,369,490. First, as shown in FIGS. 1 and 2, when slit-like laser irradiation light 2 is emitted from an irradiating section 3 toward a measuring surface 1a of an object 1 to be measured, a part of light reflected by the measuring surface 1a is received by two light receiving sections 4 and 5.

Here, in this example, the positional relationship of the two light receiving sections 4 and 5 around their respective optical axes 4a and 5a is set such that a reflected light image from the object 1 extends perpendicularly to scanning lines on a light receiving surface 7 of each two-dimensional light receiving device constituting the two light receiving sections 4 and 5 assuming that the measuring surface 1a of the object 1 is a plane perpendicular to an optical axis 3a of the irradiating section 3.

Figure 3:
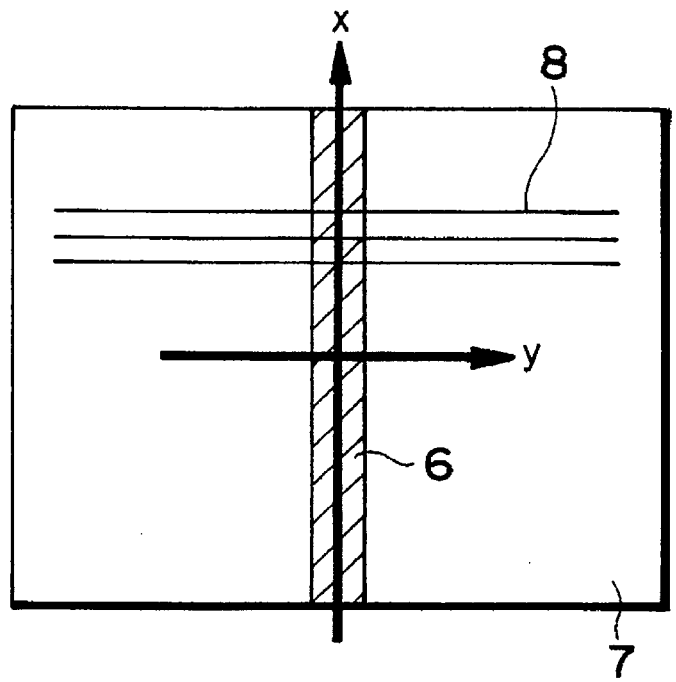
FIG. 3 is a plan view showing a reflected light image of an object to be measured which is projected onto a light receiving surface of a light receiving section in the apparatus of FIG. 1 when the measuring surface of the object to be measured is a plane.

When the measuring surface 1a is actually a plane and perpendicular to the optical axis 3a of the irradiating section 3, as shown in FIG. 3, a reflected light image 6 received by the two light receiving section 4 and 5 becomes a linear band-like form which extends perpendicularly to a scanning line 8 on the light receiving surface 7 of their two-dimensional light receiving device and is positioned at the center portion of the light receiving surface 7. When the measuring surface 1a is a curved surface, by contrast, as shown in FIG. 4, a reflected light image 6' received by the two light receiving sections 4 and 5 becomes a distorted band-like form.

Figure 2:
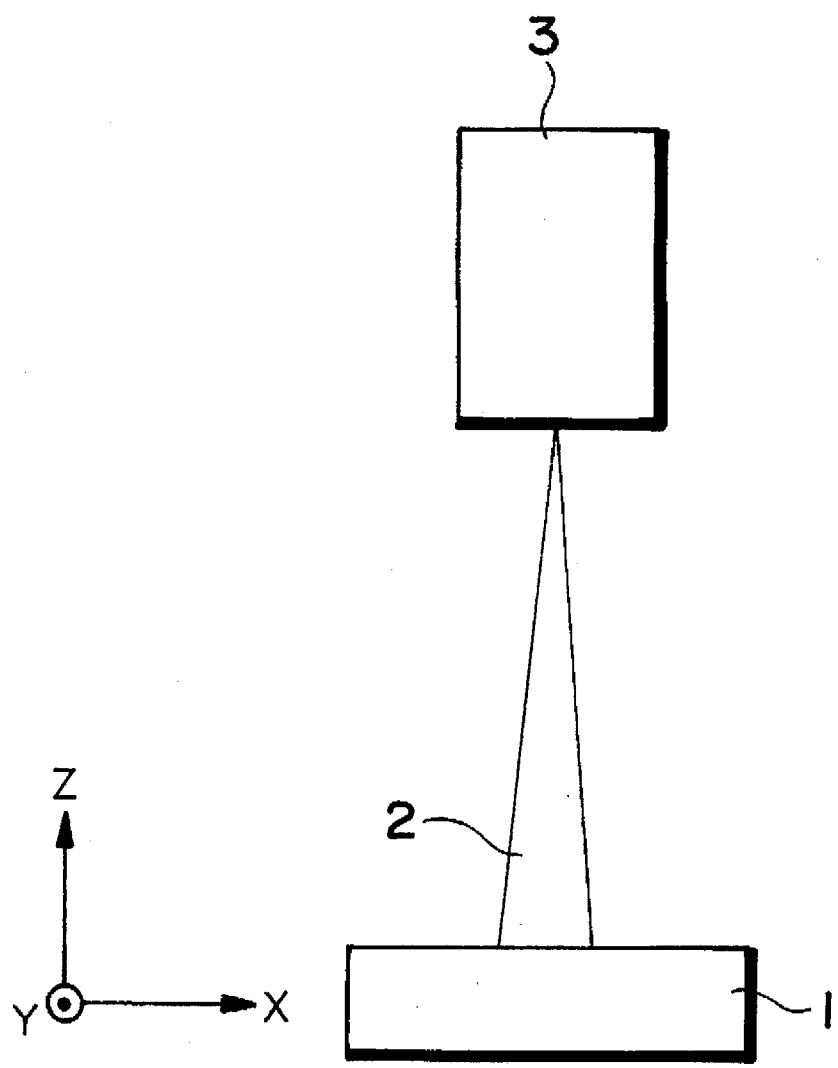
FIG. 2 is a side view showing slit-like illumination light projected from an irradiating section in the apparatus of FIG. 1.
Figure 4:
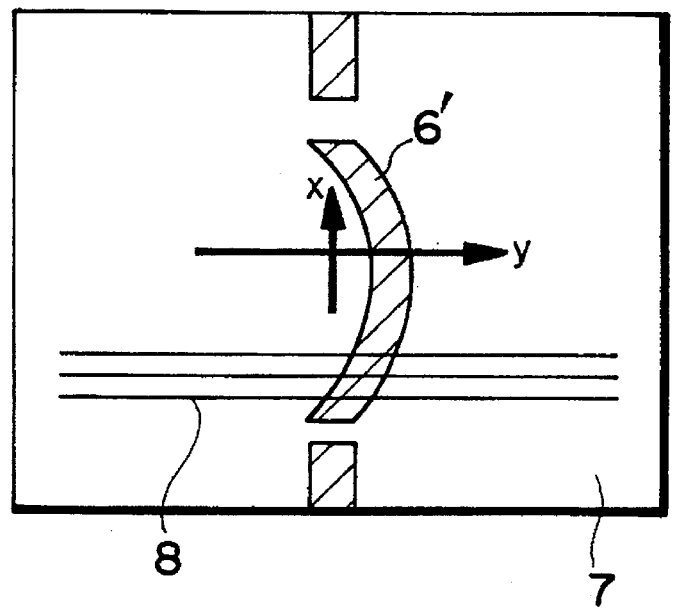
FIG. 4 is a plan view showing a reflected light image of an object to be measured which is projected onto the light receiving surface of the light receiving section in the apparatus of FIG. 1 when the measuring surface of the object to be measured is a free curved surface.

Here, a measurement coordinate system for three-dimensional form on the object 1 disposed below the irradiating section 3 and two light receiving sections 4 and 5 is defined as XYZ as shown in FIGS. 1 and 2, whereas a display coordinate system for two-dimensional form on the light receiving surface 7 of the two-dimensional light receiving sensor is defined as xy-coordinate system as shown in FIGS. 3 and 4.

The vertical axis in each of FIGS. 3 and 4 indicates the position on the light receiving surface 7 in x-axis direction corresponding to X-axis direction in FIG. 2, namely, the direction in which the slit-like irradiation light 2 expands. The horizontal axis in each of FIGS. 3 and 4 indicates the position on the light receiving surface 7 in y-axis direction which is perpendicular to the x-axis direction.

As shown in FIGS. 3 and 4, widths in the two kinds of reflected light images 6 and 6' are dependent on the slit width of the irradiation light 2, the form of the measuring surface 1a, the distance of the measuring surface 1a from the focal plane of a convergent lens within the irradiating section 3, and the like and may vary within the range of about several pixels (picture elements) to tens of pixels.

Such a reflected light image is projected onto the light receiving surface of the light receiving section. For example, when there are a plurality of light receiving sections as shown in FIG. 1, the reflected image 6 or 6' is projected onto each light receiving surface 7 of the two light receiving sections 4 and 5. Accordingly, a plurality of reflected light images can be obtained with respect to each measuring point of the object 1.

Here, as shown in FIG. 1, the two light receiving sections 4 and 5 are disposed such that angle $\theta_1$ of the optical axis 4a of the light receiving section 4 with respect to the optical axis 3a of the irradiating section 3 coincides with angle $\theta_2$ of the optical axis 5a of the light receiving section 5 with respect to the optical axis 3a of the irradiating section 3. In this case, when the measuring surface 1a is a plane, identical (or substantially identical) reflected light images are projected onto the respective light receiving surfaces 7 of the two light receiving sections 4 and 5.

Figure 8:
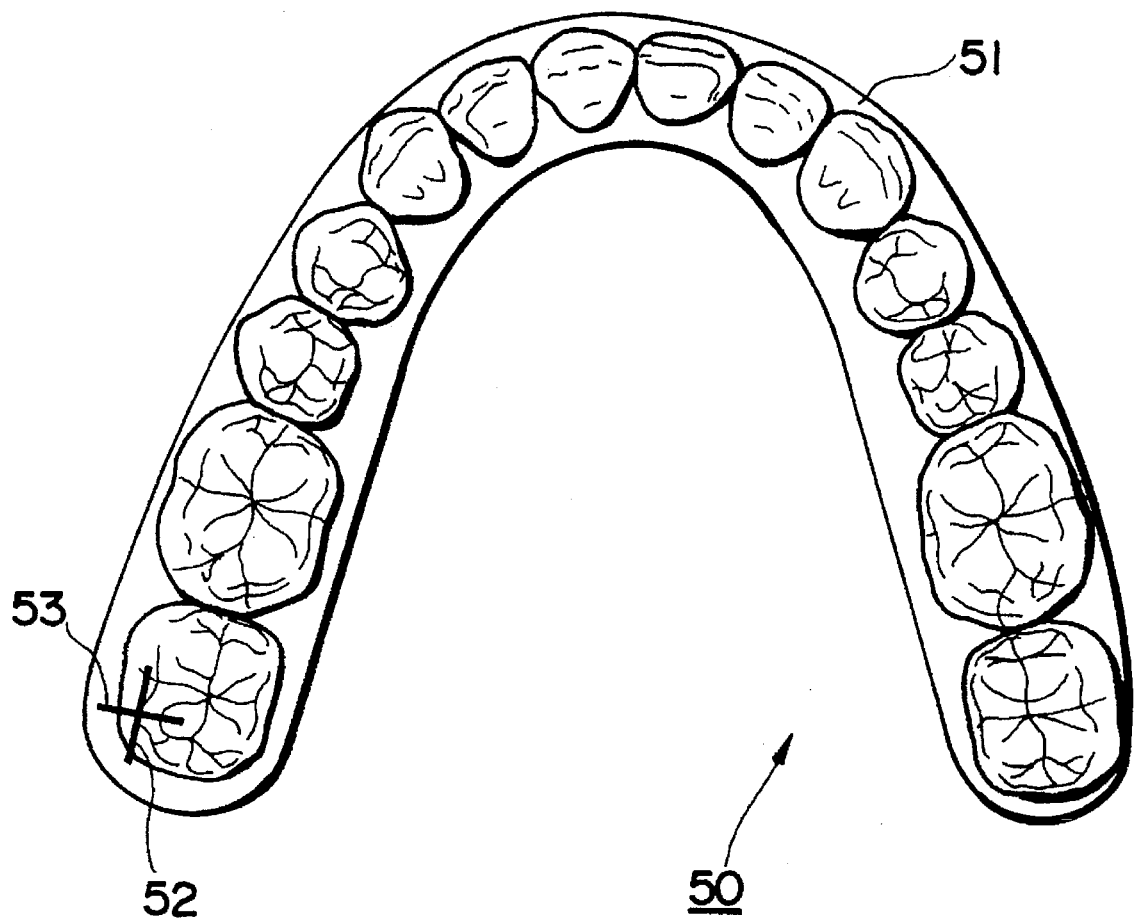
FIG. 8 is a plan view showing a configuration of a dental model used as an example of the object to be measured in the apparatus of FIG. 1.

However, in the case where the object to be measured is, as shown in FIG. 8, a dental model 50 whose measuring surface 51 is a three-dimensional free curved surface, even when derived from the same measuring point, different reflected light images are projected onto the respective light receiving surfaces 7 of the two light receiving sections 4 and 5. As differences between these two reflected light images, those remarkable are the width and maximum luminance of the reflected light image or the position, width, and maximum luminance of the reflected light image.

For example, when the measuring surface 1a shown in FIG. 1 is inclined downward to the right, the reflected light tends to be directed toward the light receiving section 4 rather than the light receiving section 5. Consequently, while a reflected light image with a high luminance is obtained at the light receiving section 4, only a reflected light image with a low luminance can be obtained at the light receiving section 5. Since the reflected light image with a low luminance obtained at the light receiving section 5 is easily influenced by noise, it deteriorates the reliability in form measurement.

Further, when the inclination in the measuring surface 1a, which is downward to the right, is particularly large, for example, when the inclination along a teeth row direction 52 in the measuring surface 51 shown in FIG. 8 is greater than the inclination along a direction 53 perpendicular thereto, the width of the reflected light image becomes too large even in the reflected light image with a high luminance obtained at the light receiving section 4. Consequently, it becomes difficult to determine the center position of the reflected light image, whereby the reliability in form measurement may deteriorate.

Figure 5:
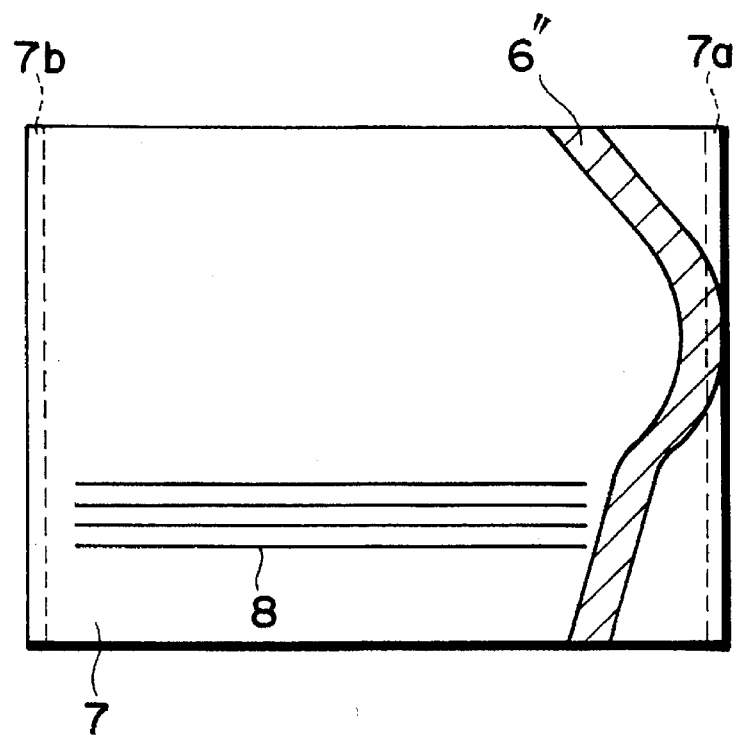
FIG. 5 is a plan view showing a reflected light image of an object to be measured which is projected onto the light receiving surface of the light receiving section in the apparatus of FIG. 1 when the measuring surface of the object to be measured is greatly inclined in particular.

Here, normally, in order to determine the center position of the reflected light image, the graphic center of the luminance distribution is computed by so-called sub-pixel processing. In this case, since a reflected light image 6" is at a position close to one end portion on the light receiving surface 7, a part of the reflected light image 6" may overhang the one end portion of the light receiving surface 7, as shown in FIG. 5, when the width of the reflected light image 6" is expanded.

For example, when it is detected at each scanning line 8 on the light receiving section 7 that the luminance on several pixels positioned at one end portion 7b of the light receiving surface 7 is less than a predetermined value while the luminance on several pixels positioned at the other end portion 7a of the light receiving surface 7 is not lower than the predetermined value, it can be judged that the reflected light image 6" is positioned not at the one end portion 7b but at the other end portion 7a. In this case, even when the center position of the reflected light image is determined by sub-pixel processing, it does not become a correct value, thereby deteriorating the reliability in form measurement.

Accordingly, when the width and maximum luminance of the reflected light image or the position, width, and maximum luminance of the reflected light image are within an appropriate range, it can be considered that the reliability in form measurement is high. Therefore, in the present invention, the reliability in measurement is judged on the basis of the width and maximum luminance of the reflected light image or the position, width, and maximum luminance of the reflected light image, whereby a signal having a high reliability is selected from output signals of the light receiving section and used as a form data.

Also, in the present invention, when the output signal for preparing data cannot be selected, an error signal, which indicates that the measurement is impossible for the relative positions of the irradiating section and light receiving section with respect to the object to be measured, is output; a control signal for instructing this relative positional relationship to change is output; or both of these signals are output. Further, in the present invention, when the output signal for preparing data cannot be selected, an error signal, which indicates that the measurement is impossible for the relative positions of the irradiating section and light receiving section with respect to the object to be measured, is output and the relative positions at which this error signal has been output are corrected.

Accordingly, while no erroneous data is prepared, measuring points which have to be measured again can be found. Alternatively, while the measuring points which have to be measured again can be found, these measuring points can be measured again with the relative position of the object with respect to the irradiating section and light receiving section being changed, so as to attain the output signal for preparing data, thereby yielding more accurate form measurement data.

Figure 6:
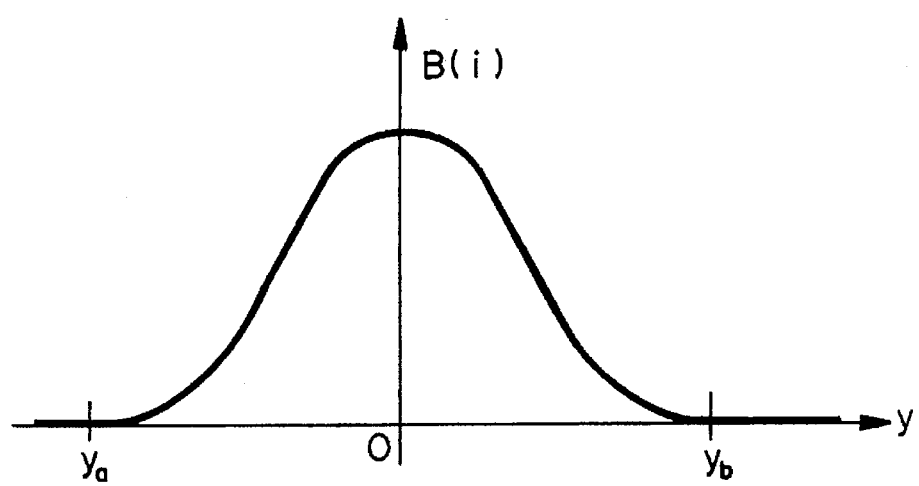
FIG. 6 is a graph showing a luminance distribution in y-axis direction in the reflected light image of the object to be measured which is projected onto the light receiving surface of FIGS. 3 to 5.

As shown in FIG. 6, the luminance distribution of each of the two kinds of reflected light images 6 and 6' becomes a Gaussian distribution. In this luminance distribution, the center portion has a high luminance while the peripheral portions have a low luminance. Accordingly, when the center position in the y-axis direction in each of the two kinds of the reflected light images 6 and 6' is estimated on the basis of sub-pixel processing, the distances of a measuring point on the object from the irradiating section and light receiving section can be computed.

In the following, the sub-pixel processing will be explained with reference to the three-dimensional form measuring apparatus of the first embodiment shown in FIG. 9.

When slit-like irradiation light 16a' is emitted from an irradiating section 16a of an optical distance measuring equipment 16 to an object 17 to be measured, a cutting line 17a formed along the contour of the object 17 is captured by a light receiving section 16b of the optical distance measuring equipment 16. Thus, for example, as shown in FIG. 4, the reflected light image 6' along the cutting line 17a is projected onto the light receiving surface 7 of a two-dimensional light receiving device constituting the light receiving section 16b.

The width of reflected light image 6' in the y-axis direction is normally greater than the length of one picture element on the light receiving section 7 in the y-axis direction and has a length of about 10 picture elements (pixels), for example. The output level distribution of one row of two-dimensional light receiving devices arranged in the y-axis direction at a certain position in the x-axis direction in FIG. 4, for example, is obtained as shown in FIG. 6. This distribution corresponds to that of the amount of received light along the y-axis direction at the certain position in the x-axis direction on the light receiving surface 7 of the two-dimensional light receiving sensor.

In this case, the center position of the reflected light image 6' in the y-axis direction with respect to a certain position in the x-axis direction corresponds to the position having the maximum output level in the output level distribution of the two-dimensional light receiving sensor. According to such sub-pixel processing, the center position of the reflected light image 6' in the y-axis direction is estimated on the basis of the output level distribution form of the two-dimensional light receiving sensor.

More specifically, a weighted mean of portions in an output level distribution chart of the two-dimensional light receiving sensor is computed or the center of gravity is derived from the output level distribution chart of the two-dimensional light receiving sensor where the amount of received light is not lower than a predetermined threshold value, so as to define the center position of the reflected light image 6' in the y-axis direction. For example, center position $y_0$ of the reflected light image 6' in the y-axis direction is computed as expressed by the following equation (1):

$$y_0 = \{\int_{y_a}^{y_b} y \cdot B(i) dy\} / \{\int_{y_a}^{y_b} B(i) dy\} \quad (1)$$

This center position $y_0$ in the y-axis direction indicates the distance from a measuring point of the object 17 corresponding to a certain position in the x-axis direction. As shown in FIG. 9, such sub-pixel processing is performed by a form data preparing section 20d on the basis of an output signal of the two-dimensional light receiving device selected by a signal selecting section 20c which will be explained later.

Next, a processing for computing a correction equation which corrects the distortion caused by the optical system of the optical distance measuring equipment 16 will be explained.

Figure 7:
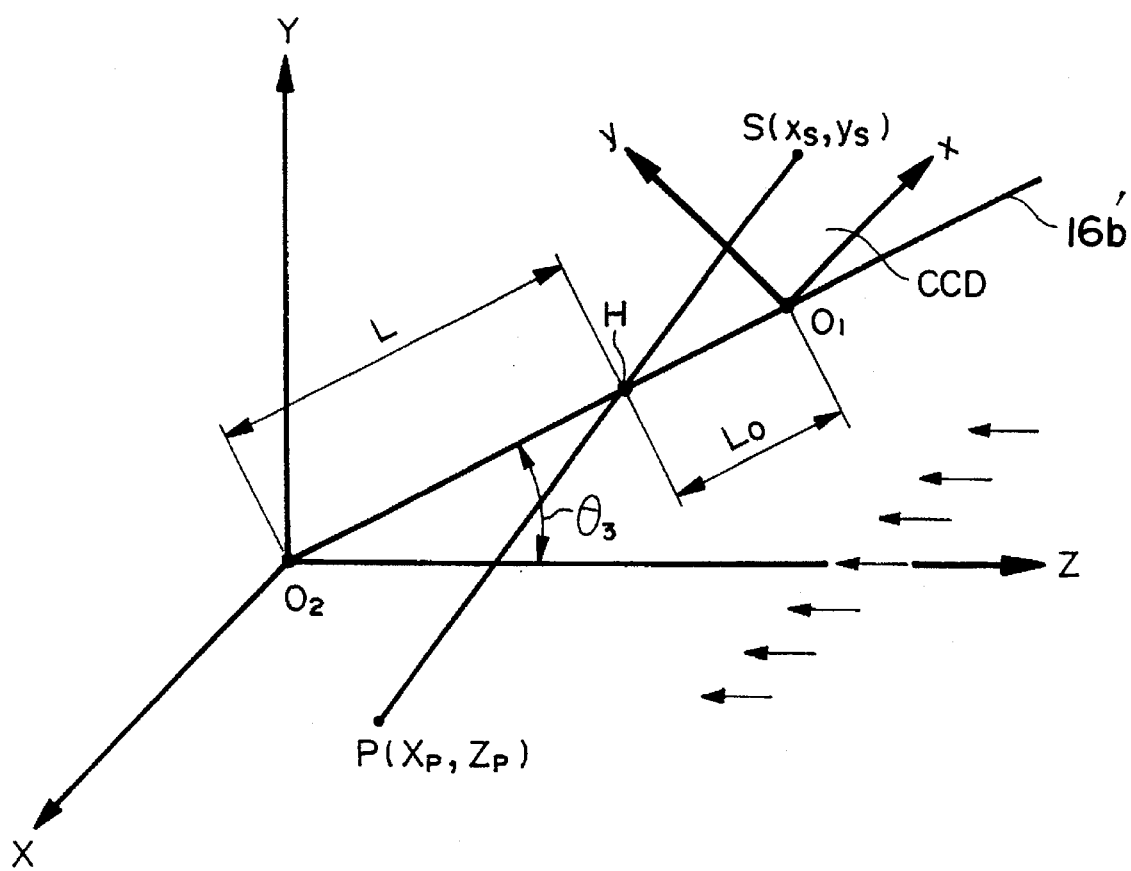
FIG. 7 is a perspective view schematically showing a relationship between an XYZ-coordinate system for three-dimensional form measurement indicating the relative positional relationship of the object to be measured with respect to the irradiating section and light receiving section in the apparatus of FIG. 1 and an xy-coordinate system for two-dimensional display indicating the distribution of the reflected light image of the object to be measured on a two-dimensional light receiving sensor constituting the light receiving surface of the light receiving section.

Here, as shown in FIG. 7, the coordinate system of position setting and changing mechanisms 12 to 15 which set and change the relative position between the optical distance measuring equipment 16 and the object 17, namely, the measurement coordinate system for three-dimensional form, is defined as XYZ-coordinate system, whereas the coordinate system for two-dimensional form on the light receiving surface 7 of the two-dimensional light receiving sensor constituting the light receiving section, namely, the display coordinate for two-dimensional coordinate system, is defined as xy-coordinate system. Also, it is assumed that a light receiving axis 16b' of the light receiving section 16b is on YZ plane.

Also, a known coordinate point in the XZ-coordinate system is defined as $P(X_p, Z_p)$, while a coordinate point in the xy-coordinate system corresponding to this point P is defined as $S(x_s, y_s)$. Further, it is assumed that the intersection between the light receiving axis 16b' and segment PS is H, that the angle of the light receiving axis 16b' with respect to the Z axis is $\theta_3$, that the length of the segment connecting the intersection H and an origin $O_1$ of the xy-coordinate system together is $L_0$, and that the length of the segment connecting the intersection H and an origin $O_2$ of the XZ-coordinate system together is L.

In this case, the relationship between the XZ-coordinate system and the xy-coordinate system can be expressed by the following equations (2) and (3):

$$Z_p = A \cdot L \cdot \sin \theta_3 + L \cdot \cos \theta_3 \quad (2)$$

$$X_p = x_s \cdot L \cdot \sin \theta_3 / (L_0 \cdot \sin \theta_3 + y_s \cdot \cos \theta_3) \quad (3)$$

wherein:

$$A = (y_s \cdot \sin \theta_3 - L_0 \cdot \cos \theta_3) / (L_0 \cdot \sin \theta_3 + y_s \cdot \cos \theta_3)$$

From these two equations, it can be seen that the Z-coordinate value $Z_p$ of the point P is determined by the value of the y-coordinate value $y_s$ of the point S, whereas the X-coordinate value $X_p$ of the point P is determined by the values of the x-coordinate value $x_s$ and y-coordinate value $y_s$ of the point S.

Here, the above-mentioned sub-pixel processing can be performed only in the y-axis direction of the light receiving surface 7 and not in the x-axis direction. Accordingly, in the conventional method, it is not that distortion can be corrected in both directions of x and y axes of the light receiving surface 7 with a sub-pixel fineness.

Therefore, taking into account the fact that the magnitudes of distortion in the x- and y-axis directions viewed from the center portion of the light receiving surface 7 are substantially symmetrical to each other, the inventors of the present application have found that the distortion can be corrected in both directions of x and y axes of the light receiving surface 7 with a sub-pixel fineness when both x- and y-axis directions are described as identical forms as a correction equation for correcting the distortion caused by the optical system of the optical distance measuring equipment 16.

Namely, it is assumed that, when one coordinate point having a known Z-coordinate value in the XZ-coordinate system is measured, the y-coordinate value obtained, with respect to an arbitrary or a certain x-coordinate value Ik, by a sub-pixel processing from a reflected light image projected onto the light receiving surface 7 is Jk, while the coordinate point having a coordinate value (Ik,Jk) on the light receiving surface 7 corresponding to the measuring point on the object to be measured is $S_s$. Here, each of Ik and Jk is a real number.

The coordinate value (Ik,Jk) of this point $S_s$ is a value including the distortion caused by the optical system of the optical distance measuring equipment. Accordingly, in order to eliminate the distortion as much as possible, a coordinate value (Kk,Lk) in which the distortion has been corrected as compared with the coordinate value (Ik,Jk) is expressed, when their secondary terms are taken into account, as shown in the following equations (4) and (5):

$$Kk = a_0 + a_1 \cdot Ik + a_2 \cdot Jk + a_3 \cdot Ik^2 + a_4 \cdot Ik \cdot Jk + a_5 \cdot Jk^2 \quad (4)$$

$$Lk = \alpha(a_0 + a_1 \cdot Ik + a_2 \cdot Jk + a_3 \cdot Ik^2 + a_4 \cdot Ik \cdot Jk + a_5 \cdot Jk^2) \quad (5)$$
$$= \alpha \cdot Kk$$

wherein each of $a_0$ to $a_5$ and $\alpha$ is a correction coefficient.

The above equation (2) is used to compute a y-coordinate value corresponding to a known Z-coordinate value, and thus computed value is defined as a theoretical value yk. A correction coefficient is determined by calculation such that the sum of squares of the difference between this theoretical value yk and the corrected coordinate value Lk indicated by the following equation (6) is minimized.

$$\Sigma_{k=1}^n (yk - Lk)^2 = \text{minimum} \quad (6)$$

Next, a procedure for actually determining the correction coefficient in this correction equation will be explained with reference to the second embodiment of the three-dimensional form measuring apparatus shown in FIG. 13.

While a white plate having a favorable flatness is mounted on a Y-stage 31, slit light is emitted from an irradiating section 24. In this case, as the Z-coordinate value in an arbitrary point on the plate to be measured is determined, the coordinate value yk corresponding to the Z-coordinate value is determined. As shown in FIG. 2, the Y-stage 31 is moved by a predetermined amount in the Y-axis direction such that the slit image 6 formed due to the reflected light from this plate is positioned at the center of the light receiving surface 7. At this moment, the y-coordinate value corresponding to the coordinate value Jk before the correction is measured with one pixel unit in each of several points on the light receiving surface 7.

Consequently, at each point on the light receiving surface 7, the coordinate value Jk in the equation (5) defining the coordinate value Lk is determined. Here, the x-coordinate value Ik of each point on the light receiving surface 7 is known, while the yk corresponding to the Z-coordinate value in the arbitrary point on the plate to be measured is known as mentioned above. Further, the Y-stage 31 is repeatedly moved by the predetermined amount in the Y-axis direction, and similar operations are performed. As a result, at each point on the light receiving surface 7, Ik, Jk, and yk in the equation (5) defining the coordinate value Lk are determined.

When data sufficient for determining the correction coefficients in the above equation (6) are thus obtained, the above equation (6) is used to compute the values of the correction coefficients so as to determine a correction equation. This correction equation is stored within a memory of the measuring apparatus. In the three-dimensional form measuring apparatus of the present invention, the correction equation is determined by an arithmetic processing section and stored in a memory.

Namely, a signal selecting section selects an output signal for preparing data among output signals of the two-dimensional light receiving sensor by detecting whether or not the width and maximum luminance of the reflected light image from the object to be measured or the position, width, and maximum luminance thereof are within a predetermined range. Also, the arithmetic processing section generates a correction equation for correcting the distortion caused by the optical system of the optical distance measuring equipment beforehand.

A form data preparing section performs the sub-pixel processing and coordinate correcting processing based on the output signal selected by the signal selecting section and the correction equation generated by the arithmetic processing section and then computes a distance data with respect to the position data for each measuring point on the object to be measured, thereby preparing a three-dimensional form data of the object.

First Embodiment

Figure 9:
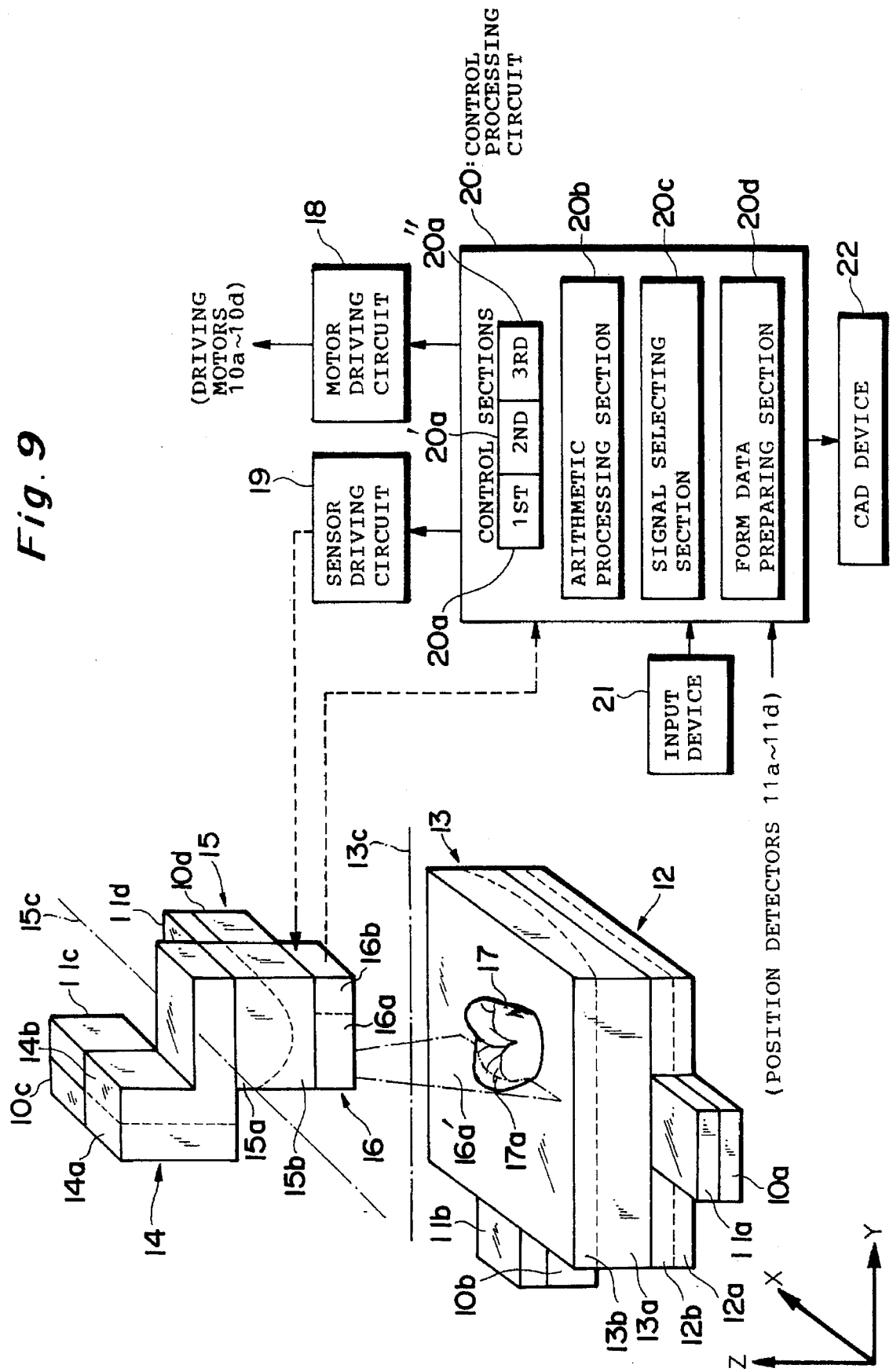
FIG. 9 is a perspective view schematically showing an overall configuration of a first embodiment in accordance with the three-dimensional form measuring apparatus of the present invention.

As shown in FIG. 9, the three-dimensional form measuring apparatus of this embodiment comprises four driving motors 10a to 10d, four position detectors 11a to 11d, four stages 12 to 15, and a laser displacement gauge 16 which are attached to a main body (not depicted). The four driving motors 10a to 10d respectively move or rotate the four stages 12 to 15. The four position detectors 11a to 11d detect the positions or moving amounts of the four stages 12 to 15, respectively. Here, as the four position detectors 11a to 11d, encoders are preferably used, for example.

The Y-stage 12 is attached onto a substrate of the main body and movable in the Y-axis direction, whereas the rotary stage 13 is attached onto the Y-stage 12 and rotatable around a rotary axis 13c extending in the Y-axis direction. Also, the Z-stage 14 is attached to a supporting section of the main body above the rotary stage 13 and movable in the Z-axis direction which is perpendicular to the surface of the Y-stage 12, whereas the rotary stage 15 is attached to the Z-stage 14 and rotatable around a rotary axis 15c extending in the X-axis direction.

The laser displacement gauge 16 is attached to a lower portion of the rotary stage 15 as an optical distance measuring equipment. The object 17 to be measured is mounted on the upper surface of the rotary stage 13. In this embodiment, the four stages 12 to 15 are configured as a position setting mechanism or a position setting and changing mechanism for setting and changing the relative positional relationship between the laser displacement gauge 16 and the object 17.

Here, in order to facilitate the understanding of the operation of each of the four stages 12 to 15, each stage is depicted as being separated into a fixed section and a movable section. Namely, the Y-stage 12 is separated into a fixed section 12a and a movable section 12b, whereas the rotary stage 13 is separated into a fixed section 13a and a movable section 13b. Also, the Z-stage 14 is separated into a fixed section 14a and a movable section 14b, whereas the rotary stage 15 is separated into a fixed section 15a and a movable section 15b.

Figure 10:
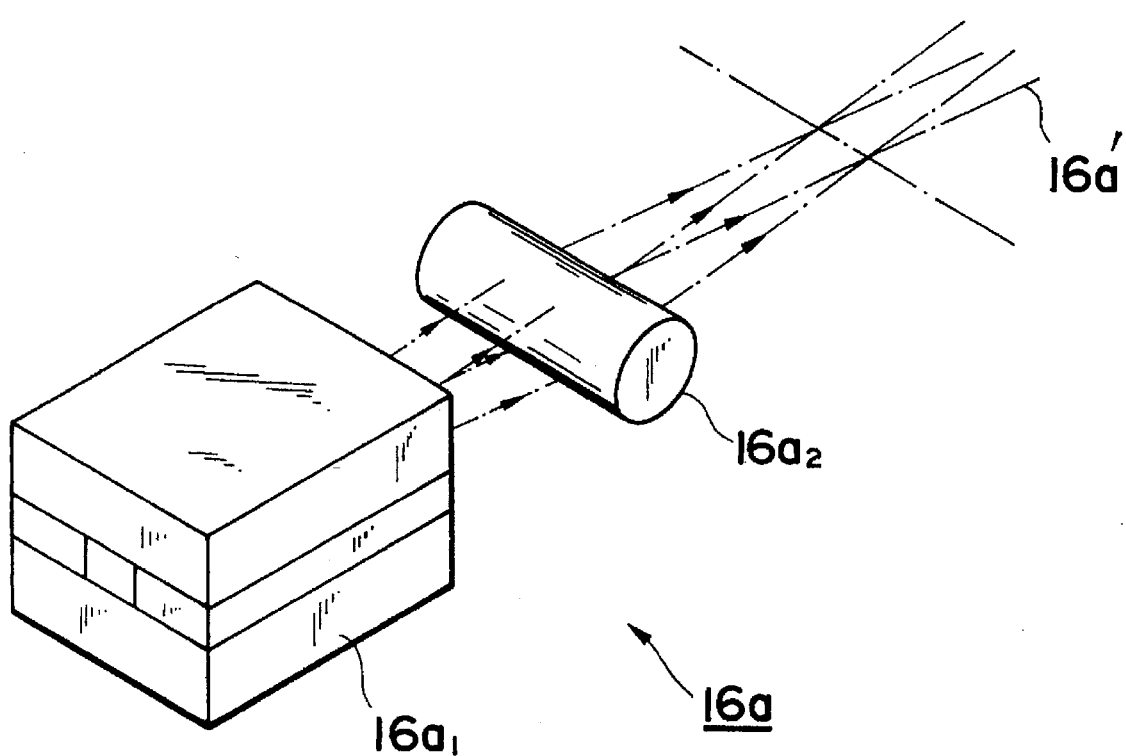
FIG. 10 is a perspective view showing a configuration of an irradiating section of a optical distance measuring equipment in the apparatus of FIG. 9.

The laser displacement gauge 16 is constituted by the irradiating section 16a and the light receiving section 16b. As shown in FIG. 10, the irradiating section 16a is configured as a semiconductor laser $16a_1$ and irradiates the object 17 with the slit-like irradiation light 16a' which is expanded in the X-axis direction perpendicular to the Y-axis direction. The laser light emitted from the irradiating section 16a has a wavelength of 670 nm. When the light receiving section 16b used has a wide sensitivity characteristic, however, a laser which generates light having other wavelengths can be used as the irradiating section 16a.

Also, the irradiating section 16a shapes the light generated by the semiconductor laser $16a_1$ into the slit-like irradiation light 16a' by using a cylindrical lens $16a_2$ disposed downstream of the semiconductor laser $16a_1$. Accordingly, the luminance of the irradiation light does not deteriorate so much as in the case where a slit is used, while the size of the apparatus does not increase so much as in the case where a polygon mirror is used.

The light receiving section 16b is configured as a two-dimensional light receiving sensor such as a two-dimensional CCD (Charge Coupled Device) composed of a plurality of light receiving devices arranged two-dimensionally and receives the light reflected by the object 17. As the light receiving section 16b, a CCD camera can be used, for example.

Here, the positional relationship of the light receiving section 16b around the optical axis thereof is set such that the reflected light image from the object 17 is perpendicular to the scanning line 8 in the light receiving surface 7 of the two-dimensional light receiving sensor of the light receiving section 16b as shown in FIG. 3 when the measuring surface 17a of the object 17 is a plane perpendicular to the optical axis of the irradiating section 16.

As shown in FIG. 9, the three-dimensional form measuring apparatus of this embodiment further comprises a motor driving circuit 18, a sensor driving circuit 19, a control processing circuit 20, an input device 21, and a CAD (Computer Aided Design) device 22. The motor driving circuit 18 drives each of the four motors 10a to 10d. The sensor driving circuit 19 drives each of the irradiating section 16a and light receiving section 16b of the laser displacement gauge 16.

The input device 21 is used for allowing an operator to supply various instructions to the control processing circuit 20. Here, as the input device 21, a keyboard is preferable, for example. The control processing circuit 20 controls the operation of each of the two driving circuits 18 and 19 on the basis of various instructions input from the input device 21, processes various data input from the four position detectors 11a to 11d and laser displacement gauge 16, and supplies thus processed data to the CAD device 22. The CAD device 22 displays or processes the three-dimensional form data input from the control processing circuit 20.

Here, the control processing circuit 20 is configured as a microcomputer or the like accommodating therein a storage device, a CPU (Central Processing Unit), and the like and performs various functions of first to third control sections 20a, 20a', and 20a", an arithmetic processing section 20b, a signal selecting section 20c, and a form data preparing section 20d. The third control section 20a" controls the operation of the laser displacement gauge 16 by way of the sensor driving circuit 19 in response to the position or moving amount of the object 17 set and moved by the position setting and changing mechanism.

In order to set or change the relative positional relationship between the laser displacement gauge 16 and the object 17 on the basis of various instructions input from the input device 21 by the operator, the first control section 20a controls the position setting and changing mechanism by way of the motor driving circuit 18, thereby setting each of the relative positions of the four stages 12 to 15 with respect to the laser displacement gauge 16 to an initial value or changing it by a predetermined value.

Based on the output signals from the two-dimensional light receiving devices constituting the light receiving section 16b of the laser displacement gauge 16, the signal selecting section 20c selects an output signal for preparing data by detecting whether or not the width and maximum luminance of the reflected light image from the object 17 are within a predetermined range or whether or not the position, width, and maximum luminance of the reflected light image from the object 17 are within a predetermined range.

Here, when an output signal of the two-dimensional light receiving sensor is such that the position, width, or maximum luminance of the reflected light image from the object 17 is outside of the predetermined range, the signal selecting section 20c cannot select this output signal from the two-dimensional light receiving sensor as an output signal for preparing data. Accordingly, the signal selecting section 20c generates an error signal which indicates that the measurement is impossible.

When the error signal is output from the signal selecting section 20c, the second control section 20a' computes, with respect to the measuring point which has failed in measurement, the relative positional relationship to be corrected between the laser displacement gauge 16 and the object 17 and controls the position setting and changing mechanism by way of the motor driving circuit 18 so as to change the respective relative positions of the four stages 12 to 15 with respect to the laser displacement gauge 16.

The arithmetic processing section 20b applies the output signal of the two-dimensional light receiving sensor to the above-mentioned relational equations (2) to (6) in the relative positional relationship between the laser displacement gauge 16 and an object to be measured having a known form (e.g., a white plate having a favorable flatness) beforehand so as to compute a correction coefficient for correcting the distortion caused by the optical system of the laser displacement gauge 16, thereby accomplishing a correction equation in which this correction coefficient has been incorporated.

On the basis of the output signal of the two-dimensional light receiving sensor selected by the signal selecting section 20c, the correction equation for distortion computed by the arithmetic processing section 20b, and output signals of the four position detectors 11a to 11d, the form data preparing section 20d performs the above-mentioned sub-pixel processing and coordinate correcting processing. Accordingly, after computing the distance data in correspondence with the position data relating to each measuring point on the object 17, the form data preparing section 20d prepares the three-dimensional form data of the object 17 and outputs thus prepared data to the CAD device 22.

In the following, an example of the operation of the three-dimensional form measuring apparatus in this embodiment will be explained.

First, when the object 17 to be measured is the dental model 50 shown in FIG. 8, the measuring portions necessary for measuring the form of this dental model 50 are the occlusal plane and side surface of teeth. Accordingly, the operator temporarily fixes the object 17 to the rotary stage 13 such that the surface of the object 17 which may not be measured faces down. Then, the operator supplies an initialization command to the control processing circuit 20 by manipulating the input device 21, whereby the initial setting of the relative positional relationship between the laser displacement gauge 16 and the object 17 is executed.

Figure 11:
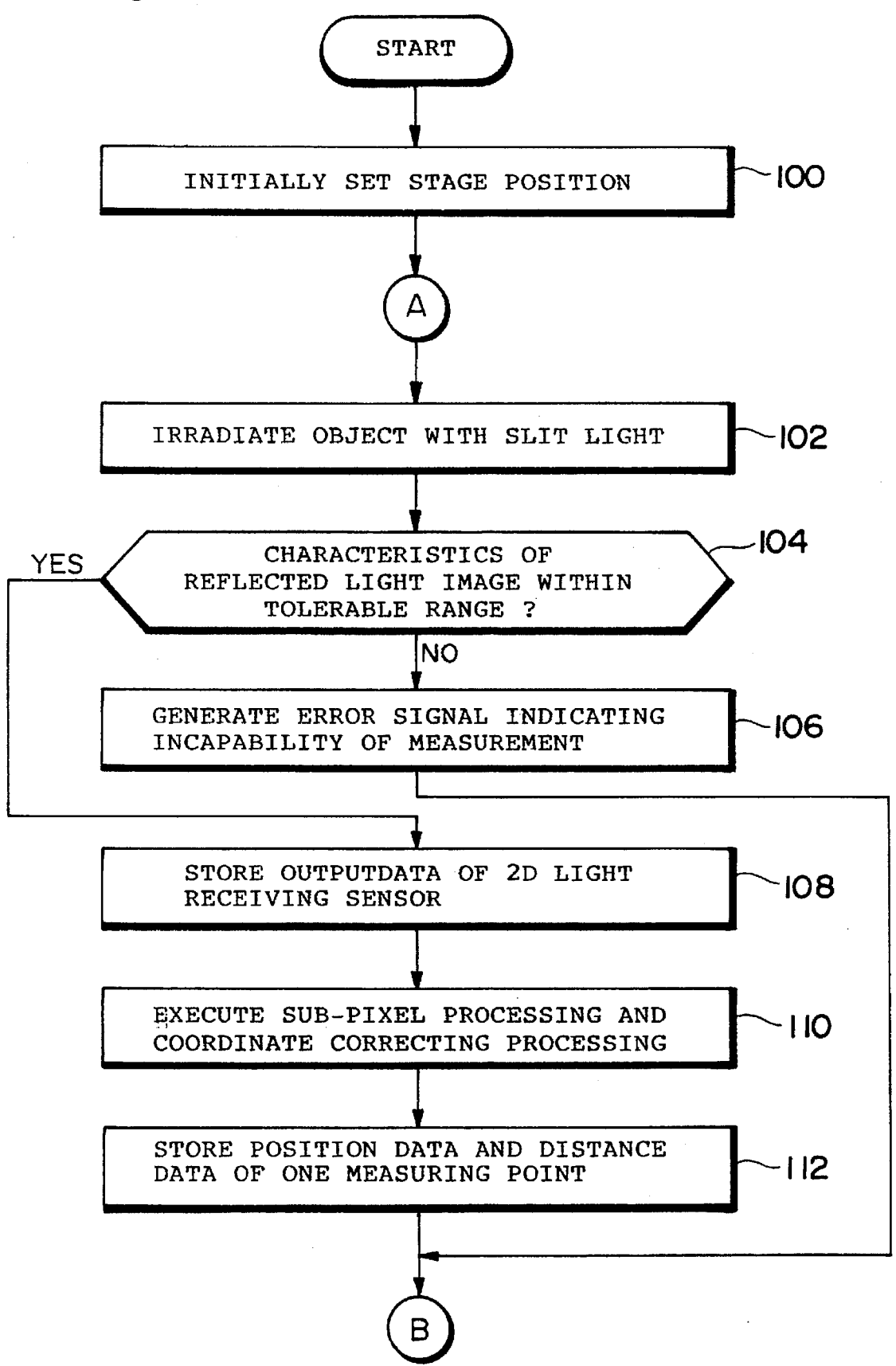
FIG. 11 is a flow chart showing the operation of a control processing circuit in the apparatus of FIG. 9.

As shown in FIG. 11, at step 100, in response to the initialization command input from the input device 21, the first control section 20a controls the position setting and changing mechanism by way of the motor driving circuit 18 so as to set each relative position of the four stages 12 to 15 with respect to the laser displacement gauge 16 to an initial value. Then, the processing by the control processing circuit 20 proceeds to step 102.

At this time, the upper surface of the rotary stage 13 is still set at a horizontal position which is in parallel to the XY plane. The lower surface of the rotary stage 15 is set such that the optical axis of the irradiating section 16a of the laser displacement gauge 16 is positioned at the origin of the XYZ-coordinate system while being perpendicular to the upper surface of the Y-stage 12. The height of the Z-stage 14 is set such that the standard object 17 to be measured is positioned at the origin of the XYZ-coordinate system while being held within the depth of focus of the light receiving lens of the light receiving section 16b of the laser displacement gauge 16. The Y-stage 12 moves so as to place the object 17 within the irradiation area of the slit light 16a' formed by the irradiating section 16a of the laser displacement gauge 16.

Subsequently, by manipulating the input device 21, the operator supplies a measurement start command to the control processing circuit 20, thereby starting the three-dimensional form measurement of the object 17. At step 102, in response to the measurement start command input from the input device 21, the first control section 20a supplies a control signal to the irradiating section 16a by way of the sensor driving circuit 19, thereby making the irradiating section 16a irradiate the object 17 with the slit light 16a'. Then, the processing by the control processing circuit 20 proceeds to step 104.

At this time, on the surface of the object 17 irradiated with the slit light 16a', the cutting line 17a is formed along the contour of the object 17. The light receiving section 16b of the laser displacement gauge 16 obliquely captures the cutting line 17a. Accordingly, as shown in FIG. 4, the reflected light image 6' of the cutting line 17a is projected onto the light receiving surface 7 of the two-dimensional light receiving sensor of the light receiving section 16b. Then, to the control processing circuit 20, the two-dimensional light receiving sensor constituting the light receiving section 16b supplies an output signal corresponding to the reflected light image 6'.

At step 104, on the basis of the output signal of the two-dimensional light receiving sensor of the light receiving section 16b, the signal selecting section 20c detects whether or not the width and maximum luminance of the reflected light image are within a tolerable range or whether or not the position, width, and maximum luminance of the reflected light image are within a tolerable range.

From this step, the processing by the control processing circuit 20 proceeds to step 106 when the position, width, or maximum luminance of the reflected light image is outside of the tolerable range. When the width and maximum luminance of the reflected light image or the position, width, and maximum luminance of the reflected light image are within the tolerable range, by contrast, the processing by the control processing circuit 20 proceeds to step 108.

At step 106, the signal selecting section 20c generates an error signal which indicates that the measurement is impossible. Then, the processing by the control processing circuit 20 proceeds to step 114. At step 108, the signal selecting section 20c selects the output signal of the two-dimensional light receiving sensor of the light receiving section 16b as an output signal for preparing data and stores it in a frame memory. Then, the processing by the control processing circuit 20 proceeds to step 110.

Here, with respect to the relative positional relationship between the laser displacement gauge 16 and the object to be measured having a known form, on the basis of the output signal of the two-dimensional light receiving sensor and the above-mentioned relational equations (2) to (6), the arithmetic processing section 20b computes a correction coefficient for correcting the distortion caused by the optical system of the laser displacement gauge 16 and stores a correction equation adopting this correction coefficient in a memory beforehand.

At step 110, on the basis of the output signal of the two-dimensional light receiving sensor selected by the signal selecting section 20c, the correction equation for distortion computed by the arithmetic processing section 20b, and output signals of the four position detectors 11a to 11d respectively indicating the positions of the four stages 12 to 15, the form data preparing section 20d executes the above-mentioned sub-pixel processing and coordinate correcting processing. Then, the processing by the control processing circuit 20 proceeds to step 112.

At step 112, the form data preparing section 20d computes a distance data for one measuring point on the object 17 and stores this distance data in a memory in conjunction with the respective position data of the four stages 12 to 15. Then, the processing by the control processing circuit 20 proceeds to step 114.

Figure 12:
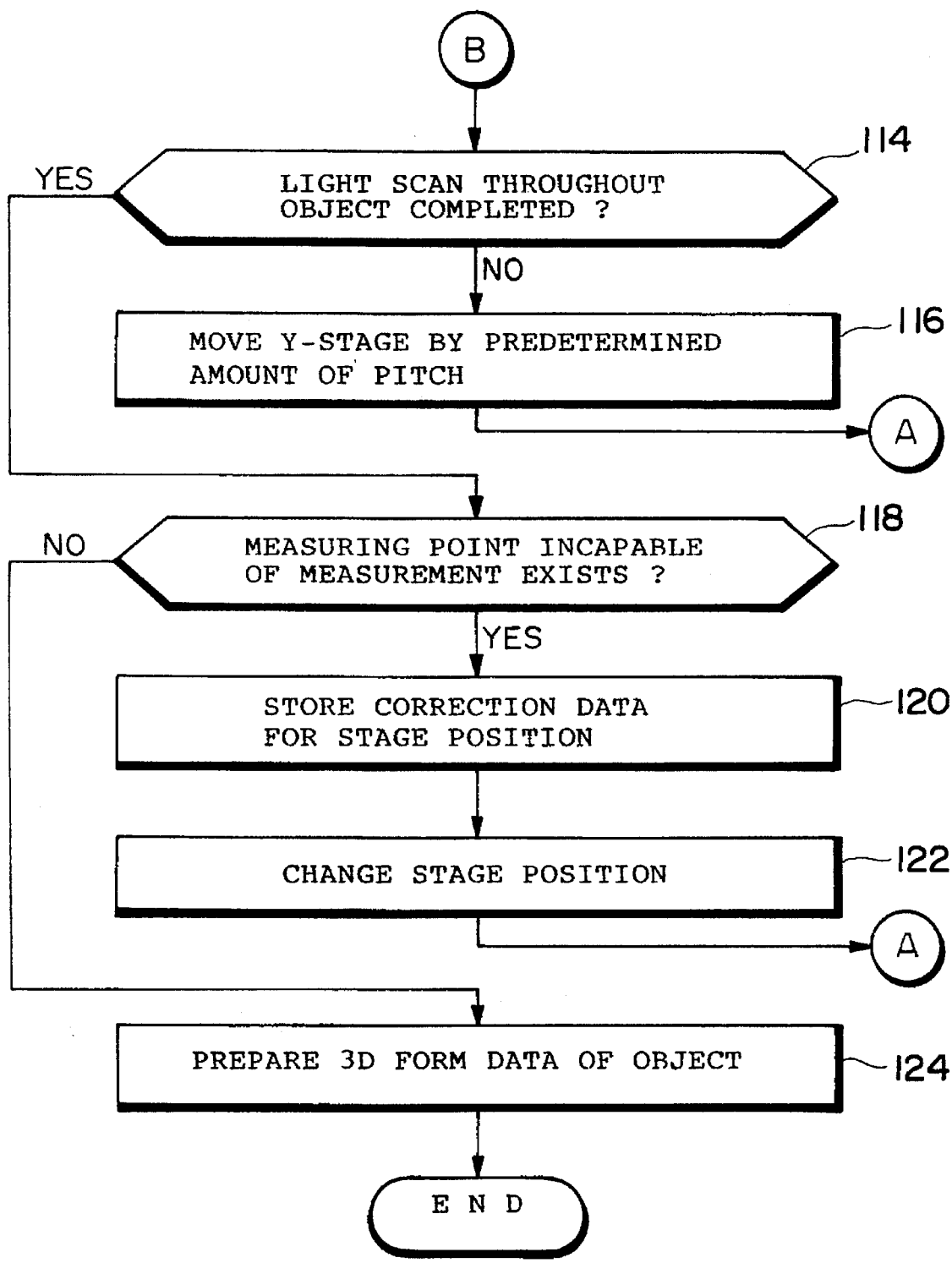
FIG. 12 is a flow chart showing the operation of the control processing circuit in the apparatus of FIG. 9 subsequent to the flow shown in FIG. 11.

As a result, the form measurement of the object 17 along one cutting line 17a is completed. As shown in FIG. 12, at step 114, the form data preparing section 20d detects whether or not the scanning of the whole area of the object 17 with the slit light 16a' from the irradiating section 16a has been completed. From this step, the processing by the control processing circuit 20 proceeds to step 116 in the case where the scanning of the whole area of the object 17 with the slit light 16a' has not been completed yet. In the case where the scanning of the whole area of the object 17 with the slit light 16a' has been completed, by contrast, the processing by the control processing circuit 20 proceeds to step 118.

At step 116, the first control section 20a controls the position setting and changing mechanism by way of the motor driving circuit 18 so as to shift the relative position of the Y-stage 12 with respect to the laser displacement gauge 16 by a predetermined amount of pitch. Then, the processing by the control processing circuit 20 proceeds to step 102.

As a result, until the scanning of the whole area of the object 17 with the slit light 16a∝ is completed, the form measuring operation including correction in a similar manner is repeated after the Y-stage 12 is moved by the predetermined amount of pitch. Consequently, each measurement data obtained by the form measurement of the object 17 along one cutting line 17a can be stored in a memory in a similar manner.

At step 118, the second control section 20a' judges whether generated by is an error signal generated by the signal selecting section 20c. In the case where the error signal has been generated, the processing by the control processing circuit 20 proceeds to step 120. In the case where the error signal has not been generated, by contrast, the processing by the control processing circuit 20 proceeds to step 124.

At step 120, the second control section 20a' computes the relative positional relationship to be corrected between the laser displacement gauge 16 and the object 17 with respect to the measuring point on the object 17 which has failed in measurement and stores, in a memory, the respective relative positions of the four stages 12 to 15 with respect to the laser displacement gauge 16 corresponding to this correction amount. Then, the processing by the control processing circuit 20 proceeds to step 122.

At step 122, the second control section 20a' controls the position setting and changing mechanism by way of the motor driving circuit 18 so as to change the respective relative positions of the four stages 12 to 15 with respect to the laser displacement gauge 16 in response to the correction amount. Then, the processing by the control processing circuit 20 proceeds to step 102.

Here, the relative positional relationship between the laser displacement gauge 16 and the object 17 may be corrected, for example, such that the irradiating angle of the slit-like irradiation light 16a emitted from the irradiating section 16a to the object 17 is rotated by 90° around an arbitrary axis with respect to that in their original relative positions, though it should not be restricted thereto.

As a result, until the signal selecting section 20c does not generate an error signal any more, the form measuring operation including correction in a similar manner is repeated after the respective relative positions of the four stages 12 to 15 with respect to the laser displacement gauge 16 are corrected. Consequently, for the measuring point which has failed in measurement, the measurement data obtained by the renewed form measurement of the object 17 along the cutting line 17a can be stored in a memory in a similar manner as well.

At step 124, on the basis of the whole measurement data composed of the position data and distance data of the measuring points stored in the memory according to the scanning of the whole area of the object 17 with the slit light 16a', the form data preparing section 20d prepares a three-dimensional form data of the object 17 and outputs this three-dimensional form data to the CAD device 22.

As a result, based on the three-dimensional form data input from the form data preparing section 20d of the control processing circuit 20, the CAD device 22 displays or processes information concerning the three-dimensional form of the object 17, thereby enabling various kinds of image processing and the like to be executed.

Accordingly, in the three-dimensional form measuring apparatus of this embodiment, while errors in measurement caused by the inclination of the measuring surface in the object 17 are reduced, the lowering of accuracy in measurement due to the distortion in the optical system of the laser displacement gauge 16 is suppressed, whereby the three-dimensional form of the object 17 can be stably measured with a high accuracy.

Second Embodiment

Figure 13:
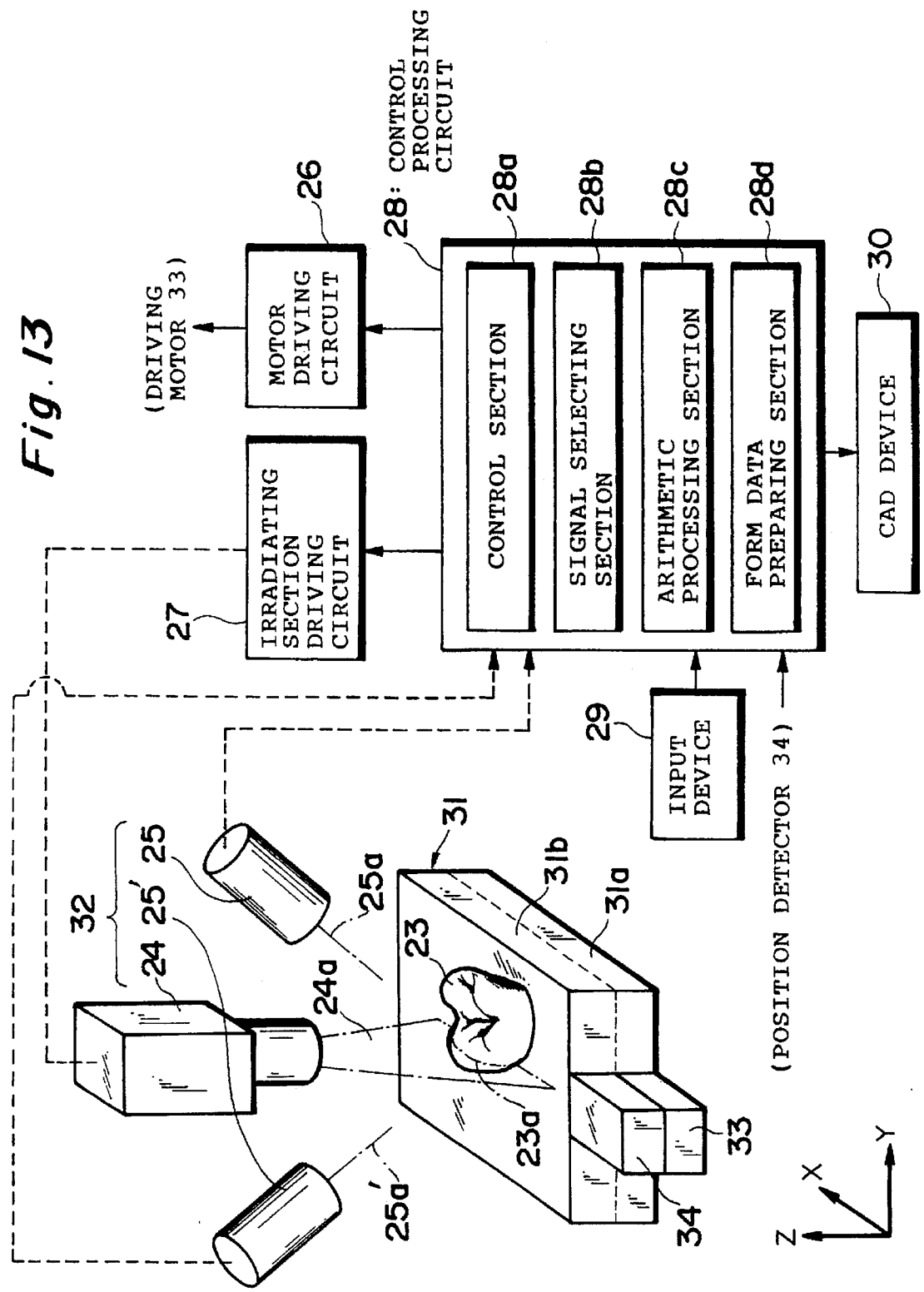
FIG. 13 is a perspective view schematically showing an overall configuration of a second embodiment in accordance with the three-dimensional form measuring apparatus of the present invention.

As shown in FIG. 13, the three-dimensional form measuring apparatus of this embodiment comprises a driving motor 33, a position detector 34, a Y-stage 31, and a laser displacement gauge 32 which are attached to a main body (not depicted). The driving motor 33 moves the Y-stage 31 along the Y-axis direction. The position detector 34 detects the position or moving amount of the Y-stage 31. Here, as the position detector 34, an encoder is preferably used, for example.

The Y-stage 31 is attached onto a substrate of the main body and movable in the Y-axis direction. The laser displacement gauge 32 is attached to a supporting section of the main body above the Y-stage 31 as an optical distance measuring equipment. An object 23 to be measured is mounted on the upper surface of the Y-stage 31.

In this embodiment, the Y-stage 31 is configured as a position setting mechanism or a position setting and changing mechanism for setting and changing the relative positional relationship between the laser displacement gauge 32 and the object 23. Here, in order to facilitate the understanding of the operation, the Y-stage 31 is depicted as being separated into a fixed section 31a and a movable section 31b.

The laser displacement gauge 32 is constituted by an irradiating section 24 and two light receiving sections 25 and 25', all of which are attached to the supporting section of the main body. The irradiating section 24 is configured as a semiconductor laser and irradiates the object 23 with slit-like irradiation light 24a which is expanded in the X-axis direction perpendicular to the Y-axis direction. The laser light emitted from the irradiating section 24 has a wavelength of 670 nm. When the two light receiving sections 25 and 25' used have a wide sensitivity characteristic, however, a laser which generates light having other wavelengths can be used as the irradiating section 24.

Also, the irradiating section 24 shapes the light generated by the semiconductor laser into the slit-like irradiation light 24a by using a cylindrical lens disposed downstream of the semiconductor laser. Accordingly, the luminance of the irradiation light does not deteriorate so much as in the case where a slit is used, while the size of the apparatus does not increase so much as in the case where a polygon mirror is used.

Each of the two light receiving section 25 and 25' is configured as a two-dimensional light receiving sensor such as a two-dimensional CCD composed of a plurality of light receiving devices arranged two-dimensionally and receives the light reflected by the object 23. As these two light receiving sections 25 and 25', CCD cameras can be used, for example. Here, the two light receiving sections 25 and 25' are disposed such that their optical axes 25a and 25a' have angles $\theta_1$ and $\theta_2$ coincided with each other with respect to the optical axis of the irradiating section 24, respectively.

Here, the positional relationship of the light receiving sections 25 and 25' around their optical axes 25a and 25a' is set such that the reflected light image from the object 23 is perpendicular to the scanning line 8 in the light receiving surface 7 of the two-dimensional light receiving sensor constituting each of the two light receiving sections 25 and 25' as shown in FIG. 3 when the measuring surface 23a of the object 23 is a plane perpendicular to the optical axis of the irradiating section 24.

As shown in FIG. 13, the three-dimensional form measuring apparatus of this embodiment further comprises a motor driving circuit 26, an irradiating section driving circuit 27, a control processing circuit 28, an input device 29, and a CAD device 30. The motor driving circuit 26 drives the driving motor 33 for the Y-stage 31. The irradiating section driving circuit 27 drives the irradiating section 24 of the laser displacement gauge 32.

The input device 29 is used for allowing an operator to supply various instructions to the control processing circuit 28. Here, as the input device 29, a keyboard is preferable, for example. The control processing circuit 28 controls the operation of each of the two driving circuits 26 and 27 on the basis of various instructions input from the input device 29, processes various data input from the position detector 34 and laser displacement gauge 32, and supplies thus processed data to the CAD device 30. The CAD device 30 displays or processes the three-dimensional form data input from the control processing circuit 28.

Here, the control processing circuit 28 is configured as a microcomputer or the like accommodating therein a storage device, a CPU, and the like and performs various functions of a control section 28a, a signal selecting section 28b, an arithmetic processing section 28c, and a form data preparing section 28d. The control section 28a controls the operation of each of the motor driving circuit 26 and the irradiating section driving circuit 27.

In order to set or change the relative positional relationship between the laser displacement gauge 32 and the object 23 on the basis of various instructions input from the input device 29 by the operator, the control section 28a controls the position setting and changing mechanism by way of the motor driving circuit 26, thereby setting the relative position of the Y-stage 31 with respect to the laser displacement gauge 32 to an initial value or changing it by a predetermined value.

Based on the output signals from the two-dimensional light receiving sensors constituting the two light receiving sections 25 and 25' of the laser displacement gauge 32, the signal selecting section 28b selects an output signal for preparing data by detecting whether or not the width and maximum luminance of the reflected light image from the object 23 are within a predetermined range or whether or not the position, width, and maximum luminance of the reflected light image from the object 23 are within a predetermined range.

Here, when an output signal of a two-dimensional light receiving sensor is such that the position, width, or maximum luminance of the reflected light image from the object 23 is outside of the predetermined range, the signal selecting section 28b cannot select this output signal from the two-dimensional light receiving sensor as an output signal for preparing data. Accordingly, the signal selecting section 28b generates an error signal which indicates that the measurement is impossible.

The arithmetic processing section 28c applies the output signal of the two-dimensional light receiving sensor to the above-mentioned relational equations (2) to (6) in the relative positional relationship between the laser displacement gauge 32 and an object to be measured having a known form (e.g., a white plate having a favorable flatness) beforehand so as to compute a correction coefficient for correcting the distortion caused by the optical system of the laser displacement gauge 32, thereby accomplishing a correction equation in which this correction coefficient has been incorporated.

On the basis of the output signal of the two-dimensional light receiving sensor selected by the signal selecting section 28b, the correction equation for distortion computed by the arithmetic processing section 28c, and an output signal of the position detector 34, the form data preparing section 28d performs the above-mentioned sub-pixel processing and coordinate correcting processing. Accordingly, after computing the distance data of each measuring point on the object 23, the form data preparing section 28d prepares the three-dimensional form data of the object 23 and outputs thus prepared data to the CAD device 30.

In the following, an example of the operation of the three-dimensional form measuring apparatus in this embodiment will be explained.

First, when the object 23 to be measured is the dental model 50 shown in FIG. 8, the measuring portions necessary for measuring the form of this dental model 50 are the occlusal plane and side surface of teeth. Accordingly, the operator temporarily fixes the object 23 to the Y-stage 31 such that the surface of the object 23 which may not be measured faces down. Then, the operator supplies an initialization command to the control processing circuit 28 by manipulating the input device 29, whereby the initial setting of the relative positional relationship between the laser displacement gauge 32 and the object 23 is executed.

Figure 14:
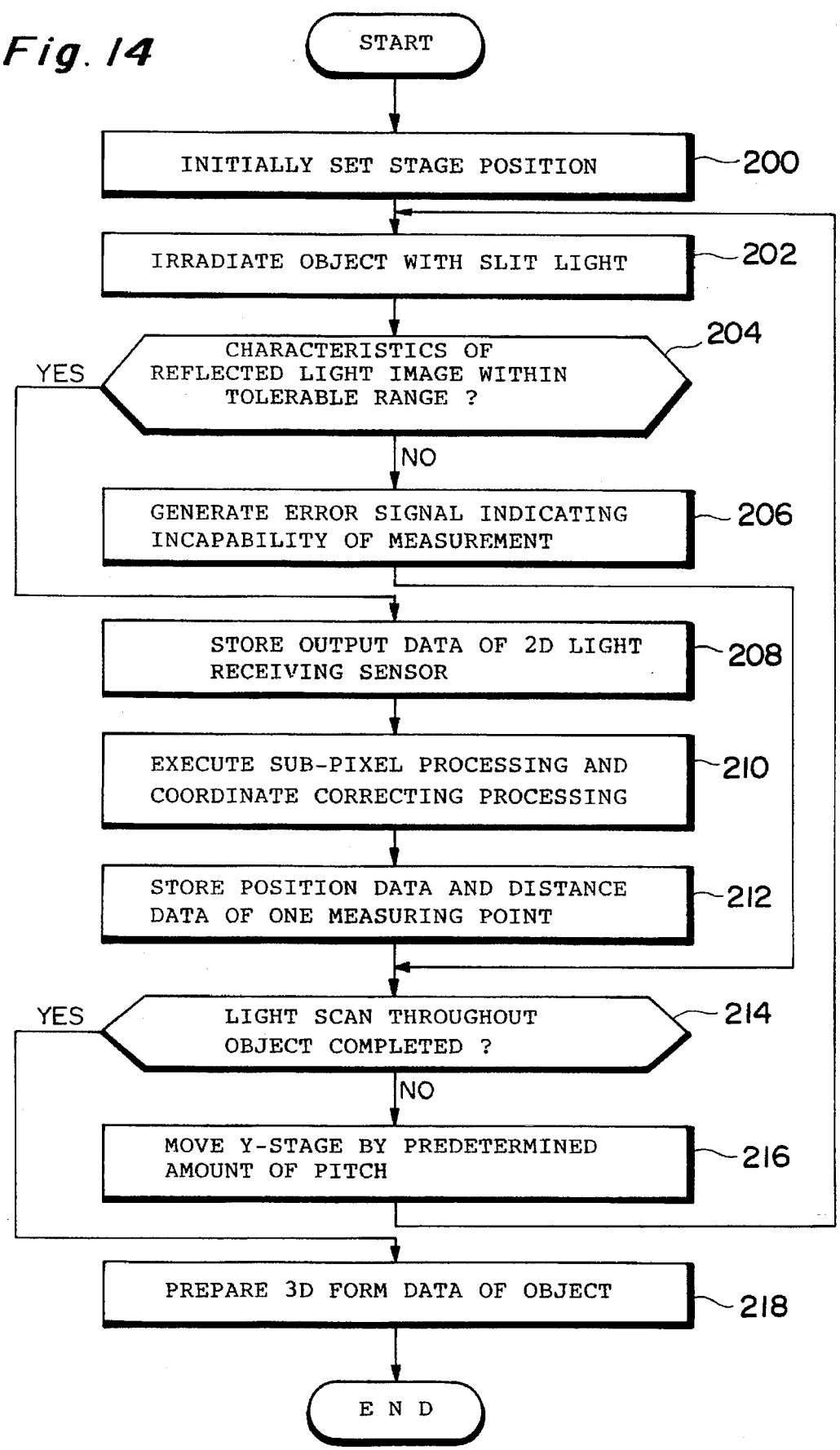
FIG. 14 is a flow chart showing the operation of a control processing circuit in the apparatus of FIG. 13.

As shown in FIG. 14, at step 200, in response to the initialization command input from the input device 29, the first control section 28a controls the motor driving circuit 26 so as to set the relative position of the Y-stage 31 with respect to the laser displacement gauge 32 to an initial value. Then, the processing by the control processing circuit 20 proceeds to step 202.

At this time, the Y-stage 31 moves so as to place the object 23 within the irradiation area of the slit light 24a formed by the irradiating section 24 of the laser displacement gauge 32. Subsequently, by manipulating the input device 29, the operator supplies a measurement start command to the control processing circuit 28, thereby starting the three-dimensional form measurement of the object 23.

At step 202, in response to the measurement start command input from the input device 29, the control section 28a supplies a control signal to the irradiating section 24 by way of the irradiating section driving circuit 27, thereby making the irradiating section 24 irradiate the object 23 with the slit light 24a. Then, the processing by the control processing circuit 20 proceeds to step 204.

At this time, on the surface of the object 23 irradiated with the slit light 24a, a cutting line 23a is formed along the contour of the object 23. The two light receiving sections 25 and 25' obliquely capture the cutting line 23a. Accordingly, as shown in FIG. 4, the reflected light image 6' of the cutting line 23a is projected onto each light receiving surface 7 of the two-dimensional light receiving sensors of the two light receiving sections 25 and 25'. Then, to the control processing circuit 28, the two-dimensional light receiving sensors constituting the two light receiving sections 25 and 25' respectively supply output signals corresponding to the reflected light image 6'.

At step 204, on the basis of the output signals of the two-dimensional light receiving sensors of the two light receiving sections 25 and 25', the signal selecting section 28b detects whether or not the width and maximum luminance of the reflected light image are within a tolerable range or whether or not the position, width, and maximum luminance of the reflected light image are within a tolerable range.

From this step, the processing by the control processing circuit 28 proceeds to step 206 when the position, width, or maximum luminance of the reflected light image is outside of the tolerable range. When the width and maximum luminance of the reflected light image or the position, width, and maximum luminance of the reflected light image are within the tolerable range, by contrast, the processing by the control processing circuit 28 proceeds to step 208.

At step 206, the signal selecting section 28b generates an error signal which indicates that the measurement is impossible. Therefore, the measurement data concerning the measuring point which has failed in measurement is never stored in a memory. Then, the processing by the control processing circuit 28 proceeds to step 214.

At step 208, the signal selecting section 28b selects, among the output signals of the respective two-dimensional light receiving sensors of the two light receiving sections 25 and 25', the output signal representing an optimal reflected light image with respect to the above-mentioned tolerable range as an output signal for preparing data and stores it in a frame memory. Then, the processing by the control processing circuit 28 proceeds to step 210.

Here, with respect to the relative positional relationship between the laser displacement gauge 32 and the object to be measured having a known form, on the basis of the output signals of the two-dimensional light receiving sensors and the above-mentioned relational expressions (2) to (6), the arithmetic processing section 28c computes a correction coefficient for correcting the distortion caused by the optical system of the laser displacement gauge 32 and stores a correction equation adopting this correction coefficient in a memory.

At step 210, on the basis of the output signal of the two-dimensional light receiving sensor selected by the signal selecting section 28b, the correction equation for distortion computed by the arithmetic processing section 28c, and an output signal of the position detector 34 indicating the position of the Y-stage 31, the form data preparing section 28d executes the above-mentioned sub-pixel processing and coordinate correcting processing. Then, the processing by the control processing circuit 28 proceeds to step 212.

At step 212, the form data preparing section 28d computes a distance data for one measuring point on the object 23 and stores this distance data in a memory in conjunction with the position data of the Y-stage 31. Then, the processing by the control processing circuit 28 proceeds to step 214.

As a result, the form measurement of the object 23 along one cutting line 23a is completed. At step 214, the form data preparing section 28d detects whether or not the scanning of the whole area of the object 23 with the slit light 24a from the irradiating section 24 has been completed. From this step, the processing by the control processing circuit 28 proceeds to step 216 in the case where the scanning of the whole area of the object 23 with the slit light 24a has not been completed yet. In the case where the scanning of the whole area of the object 23 with the slit light 24a has been completed, by contrast, the processing by the control processing circuit 28 proceeds to step 218.

At step 216, the control section 28a supplies a control signal to the motor driving circuit 26 so as to shift the relative position of the Y-stage 31 with respect to the laser displacement gauge 32 by a predetermined amount of pitch. Then, the processing by the control processing circuit 28 proceeds to step 202.

As a result, until the scanning of the whole area of the object 23 with the slit light 24a is completed, the form measuring operation including correction in a similar manner is repeated after the Y-stage 31 is moved by the predetermined amount of pitch. Consequently, each measurement data obtained by the form measurement of the object 23 along one cutting line 23a can be stored in a memory in a similar manner.

At step 218, on the basis of the whole measurement data composed of the position data and distance data of the measuring points stored in the memory according to the scanning of the whole area of the object 23 with the slit light 24a, the form data preparing section 28d prepares a three-dimensional form data of the object 23 and outputs this three-dimensional form data to the CAD device 30.

As a result, based on the three-dimensional form data input from the form data preparing section 28d of the control processing circuit 28, the CAD device 30 displays or processes information concerning the three-dimensional form of the object 23, thereby enabling various kinds of image processing and the like to be executed.

Accordingly, in the three-dimensional form measuring apparatus of this embodiment, while errors in measurement caused by the inclination of the measuring surface in the object 23 are reduced, the lowering of accuracy in measurement due to the distortion in the optical system of the laser displacement gauge 32 is suppressed, whereby the three-dimensional form of the object 23 can be stably measured with a high accuracy.

Here, without being restricted to the above-mentioned embodiments, the present invention can be modified in various manners.

For example, a single laser displacement gauge is used as the optical distance measuring equipment in the above-mentioned embodiments. However, not only a single but also a plurality of laser displacement gauges may be used as the optical distance measuring equipment.

Also, the position setting and changing mechanism for setting and changing the relative positional relationship between the laser displacement gauge and the object to be measured is constituted as a single stage mechanism or a plurality of stage mechanisms in the above-mentioned embodiments. However, without being restricted to such stage mechanisms, the position setting and changing mechanism may have any configuration as long as it can set and change the relative positional relationship between the laser displacement gauge and the object to be measured to a position necessary for measuring a desired three-dimensional form.

As explained in detail in the foregoing, in the three-dimensional form measuring apparatus of the present invention, the three-dimensional form data is prepared on the basis of an output signal for preparing data which is selected from output signals of a two-dimensional light receiving sensor by detecting whether or not the width and maximum luminance of the reflected light image from the object are within a predetermined range or by detecting whether or not the position, width, and maximum luminance of the reflected light image from the object are within a predetermined range.

More specifically, in the three-dimensional form measuring apparatus of the present invention, from output signals of the two-dimensional light receiving sensor constituting the light receiving section of the optical distance measuring equipment, the signal selecting section selects an output signal for preparing data by detecting whether or not the width and maximum luminance of the reflected light image are within a predetermined range or by detecting whether or not the position, width, and maximum luminance of the reflected light image are within a predetermined range. Then, the form data preparing section determines the position data and distance data for each measuring point on the object to be measured by conducting the sub-pixel processing for computing the center position of the reflected light image with a fineness not greater than a picture element unit of the two-dimensional light receiving sensor of the optical distance measuring equipment and the coordinate correcting processing for correcting the distortion caused by the optical system of the optical distance measuring equipment.

Also, when the output signal for preparing data cannot be selected, the signal selecting section generates an error signal indicating that the measurement is impossible, while the control section corrects the relative positional relationship between the measuring point at which the error signal has been output and the optical distance measuring equipment. Accordingly, without erroneous measurement data being prepared, the measuring points which have to be measured again can be found. Further, when the measurement is performed again with the corrected relative positional relationship between the measuring point which has to be measured again and the optical distance measuring equipment, a correct signal for preparing data is obtained, whereby more accurate form measurement data can be attained.

Accordingly, in accordance with the three-dimensional form measuring apparatus of the present invention, errors in measurement caused by the inclination of the measuring surface of the object to be measured are reduced and the lowering of the accuracy in measurement caused by the optical system of the optical distance measuring equipment is suppressed, such that the three-dimensional form of the object can be stably measured with a high accuracy.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application Nos. 137344/1995 (7-137344) filed on May 11, 1995, 159828/1995 (7-159828) filed on Jun. 2, 1995, 159829/1995 (7-159829) filed on Jun. 2, 1995, and 159830/1995 (7-159830) filed on Jun. 2, 1995, are hereby incorporated by reference.

What is claimed is:

1. A three-dimensional form measuring apparatus comprising:

an optical distance measuring equipment including an irradiating section for irradiating an object to be measured with slit-like irradiation light and a light receiving section which has a two-dimensional light receiving sensor composed of a plurality of light receiving devices arranged two-dimensionally and receives, on said two-dimensional light receiving sensor, incident reflected light from said object irradiated with the irradiation light;

a position setting mechanism for setting a relative positional relationship between said optical distance measuring equipment and said object;

a signal selecting section which detects whether or not width and maximum luminance of an optical image reflected by said object are within a predetermined range and thereby selects, as an output signal for preparing data, an output signal of said two-dimensional light receiving sensor concerning the relative positional relationship between said optical distance measuring equipment and said object set by said position setting mechanism; and a form data preparing section which prepares a three-dimensional form data of said object based on the output signal of said two-dimensional light receiving sensor selected by said signal selecting section.

2. A three-dimensional form measuring apparatus according to claim 1, further comprising:

a control section for controlling each operation of said position setting mechanism and said irradiating section and a position detecting mechanism for detecting a position or moving amount of said position setting mechanism.

3. A three-dimensional form measuring apparatus according to claim 1, wherein, in order to select the output signal for preparing data from output signals of said two-dimensional light receiving sensor, said signal selecting section detects whether or not position, width, and maximum luminance of the optical image reflected by said object are within a predetermined range.

4. A three-dimensional form measuring apparatus according to claim 1,
wherein said irradiating section includes a semiconductor laser for generating the irradiation light and a cylindrical lens for shaping the irradiation light emitted from said semiconductor laser into a slit-like form.

5. A three-dimensional form measuring apparatus according to claim 1, further comprising:
an arithmetic processing section which computes a correction equation for correcting distortion caused by an optical system of said optical distance measuring equipment,
wherein said form data preparing section prepares the three-dimensional form data of said object based on the output signal of said two-dimensional light receiving sensor selected by said signal selecting section and the correction equation computed by said arithmetic processing section.

6. A three-dimensional form measuring apparatus according to claim 1,
wherein said position setting mechanism is configured as a position setting and changing mechanism which sets or changes the relative positional relationship between said optical distance measuring equipment and said object and
wherein said signal selecting section detects whether or not the width and maximum luminance of the optical image reflected by the object are within the predetermined range and thereby selects, as the output signal for preparing data, an output signal of said two-dimensional light receiving sensor in the relative positional relationship between said optical distance measuring equipment and said object changed by said position setting and changing mechanism.

7. A three-dimensional form measuring apparatus according to claim 6, further comprising:
a control section for controlling each operation of said position setting and changing mechanism and said irradiating section and
a position detecting mechanism for detecting a position or moving amount of said position setting and changing mechanism.

8. A three-dimensional form measuring apparatus according to claim 6,
wherein, based on the output signal of said two-dimensional light receiving sensor, said signal selecting section outputs an error signal, which indicates that measurement is impossible, when the width and maximum luminance of the optical image reflected by said object are outside of the predetermined range.

9. A three-dimensional form measuring apparatus according to claim 6,
wherein, based on the output signal of said two-dimensional light receiving sensor, said signal selecting section outputs an error signal, which indicates that measurement is impossible, and/or outputs a control signal for instructing said position setting and changing mechanism to change the relative positional relationship between said optical distance measuring equipment and said object, when the width and maximum luminance of the optical image reflected by said object are outside of the predetermined range.

10. A three-dimensional form measuring apparatus according to claim 9,
wherein, in order to select the output signal for preparing data from output signals of said two-dimensional light receiving sensor, said signal selecting section detects whether or not position, width, and maximum luminance of the optical image reflected by said object are within a predetermined range.

11. A three-dimensional form measuring apparatus according to claim 9, further comprising:
a first control section which controls said position setting and changing mechanism so as to set or change the relative positional relationship between said optical distance measuring equipment and said object to a predetermined relationship and
a second control section which computes a correction amount for the relative positional relationship between said optical distance measuring equipment and said object concerning a measuring point of said object at which said signal selecting section has generated the error signal and, in response to said correction amount, controls said position setting and changing mechanism.

12. A three-dimensional form measuring apparatus according to claim 11, further comprising:
a third control section which, in response to a position and moving amount of said position setting and changing mechanism, controls an operation of said irradiating section and
a position detecting mechanism which detects a position or driving amount of said position setting and changing mechanism.

13. A three-dimensional form measuring method comprising:
a first step of setting, by means of a position setting mechanism, a relative positional relationship between an optical distance measuring equipment and an object to be measured;
a second step of irradiating, by means of an irradiating section of said optical distance measuring equipment, said object with slit-like irradiation light and receiving, on a two-dimensional light receiving sensor composed of a plurality of light receiving devices arranged two-dimensionally at a light receiving section of said optical distance measuring equipment, incident reflected light from said object;
a third step of selecting as an output signal for preparing data, by means of a signal selecting section, an output signal of said two-dimensional light receiving sensor concerning the relative positional relationship between said optical distance measuring equipment and said object set by said position setting mechanism, based on detection of whether or not width and maximum luminance of an optical image reflected by said object are within a predetermined range; and
a fourth step of preparing, by means of a form data preparing section, a three-dimensional form data of said object based on the output signal of said two-dimensional light receiving sensor selected by said signal selecting section.

14. A three-dimensional form measuring method according to claim 13,
wherein, in said first step, an operation of said position setting mechanism is controlled by a control section while a position or moving amount of said position setting mechanism is detected by a position detecting mechanism and
wherein, in said second step, an operation of said irradiating section is controlled by said control section.

15. A three-dimensional form measuring method according to claim 13, wherein, in said third step, in order to select the output signal for preparing data from output signals of said two-dimensional light receiving sensor by said signal selecting section, whether or not position, width, and maximum luminance of the optical image reflected by said object are within a predetermined range is detected by said signal selecting section.

16. A three-dimensional form measuring method according to claim 13, wherein, in said second step, the irradiation light is generated by a semiconductor laser of said irradiating section and the irradiation light emitted from said semiconductor laser is shaped into a slit-like form by a cylindrical lens of said irradiating section.

17. A three-dimensional form measuring method according to claim 13, wherein, in said fourth step, a correction equation for correcting the distortion caused by an optical system of said optical distance measuring equipment is computed by an arithmetic processing section and then, based on the output signal of said two-dimensional light receiving sensor selected by said signal selecting section and the correction equation computed by said arithmetic processing section, the three-dimensional form data of said object is prepared by said form data preparing section.

18. A three-dimensional form measuring method according to claim 13, further comprising:

a fifth step of executing said second and third steps again between said third and fourth steps after the relative positional relationship between said optical distance measuring equipment and said object is set or changed by a position setting and changing mechanism, until measurement of the whole area of said object is completed.

19. A three-dimensional form measuring method according to claim 18, wherein an operation of said position setting and changing mechanism is controlled by a control section while a position or moving amount of said position setting mechanism is detected by a position detecting mechanism in said first and fifth steps and wherein an operation of said irradiating section is controlled by said control section in said second step.

20. A three-dimensional form measuring method according to claim 18, wherein, in said third step, based on an output signal of said two-dimensional light receiving sensor, said signal selecting section outputs an error signal, which indicates that measurement is impossible, when the width and maximum luminance of the optical image reflected by said object are outside of the predetermined range.

21. A three-dimensional form measuring method according to claim 18, wherein, in said third step, based on an output signal of said two-dimensional light receiving sensor, said signal selecting section outputs an error signal, which indicates that measurement is impossible, and/or outputs a control signal for instructing said position setting and changing mechanism to change the relative positional relationship between said optical distance measuring equipment and said object, when the width and maximum luminance of the optical image reflected by said object are outside of the predetermined range.

22. A three-dimensional form measuring method according to claim 21, wherein, in said third step, in order to select the output signal for preparing data from output signals of said two-dimensional light receiving sensor by said signal selecting section, whether or not position, width, and maximum luminance of the optical image reflected by said object are within a predetermined range is detected by said signal selecting section.

23. A three-dimensional form measuring method according to claim 21, further comprising:

a sixth step of executing said second and third steps again between said fifth and fourth steps after the relative positional relationship between said optical distance measuring equipment and said object concerning the measuring point of said object at which said signal selecting section has generated the error signal is corrected by said position setting and changing mechanism, until there exists no measuring point at which said signal selecting section has generated the error signal, wherein, in said fifth step, said position setting and changing mechanism is controlled by a first control section so as to set or change the relative positional relationship between said optical distance measuring equipment and said object, and wherein, in said sixth step, a correction amount for the relative positional relationship between said optical distance measuring equipment and said object is computed by a second control section and, in response to this correction amount, said position setting and changing mechanism is controlled.

24. A three-dimensional form measuring method according to claim 23, wherein an operation of said position setting and changing mechanism is controlled by a third control section in said first step, wherein an operation of said irradiating section is controlled by said third control section in said second step, and wherein a position or moving amount of said position setting and changing mechanism is detected by a position detecting mechanism in said first, fifth, and sixth steps.

* * * * *